(12) United States Patent
Hong

(10) Patent No.: US 11,029,854 B2
(45) Date of Patent: Jun. 8, 2021

(54) MEMORY CONTROLLER FOR CONCURRENTLY WRITING HOST DATA AND GARBAGE COLLECTED DATA AND OPERATING METHOD THEREOF

(71) Applicant: SK hynix Inc., Gyeonggi-do (KR)

(72) Inventor: Sung Kwan Hong, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 95 days.

(21) Appl. No.: 16/119,687

(22) Filed: Aug. 31, 2018

(65) Prior Publication Data

US 2019/0227715 A1 Jul. 25, 2019

(30) Foreign Application Priority Data

Jan. 24, 2018 (KR) .................. 10-2018-0008983

(51) Int. Cl.
*G06F 3/06* (2006.01)
*G06F 12/0891* (2016.01)

(52) U.S. Cl.
CPC .......... *G06F 3/0611* (2013.01); *G06F 3/0652* (2013.01); *G06F 3/0656* (2013.01); *G06F 3/0658* (2013.01); *G06F 3/0659* (2013.01); *G06F 3/0679* (2013.01); *G06F 12/0891* (2013.01); *G06F 2212/1024* (2013.01); *G06F 2212/7205* (2013.01)

(58) Field of Classification Search
CPC ...... G06F 3/0608; G06F 3/061; G06F 3/0611; G06F 3/0652; G06F 3/0656; G06F 3/0658; G06F 3/0659; G06F 3/0679; G06F 12/0246; G06F 12/0891; G06F 13/1621; G06F 13/1673; G06F 2212/1024; G06F 2212/1044; G06F 2212/7203; G06F 2212/7205
See application file for complete search history.

(56) References Cited

U.S. PATENT DOCUMENTS 9,436,595 B1 * 9/2016 Benitez ............... G06F 12/0246
2012/0151124 A1 * 6/2012 Baek .................... G06F 12/0246
711/103

FOREIGN PATENT DOCUMENTS

KR 1020160078611 7/2016
KR 101735142 5/2017

* cited by examiner

*Primary Examiner* — Aracelis Ruiz
(74) *Attorney, Agent, or Firm* — IP & T Group LLP

(57) ABSTRACT

In a memory controller for controlling an operation of a memory device, the memory controller includes a buffer memory and a processor. The buffer memory stores first data received from a host and second data received from the memory device. The processor controls the memory controller to generate a write command for programming the first data and the second data to the memory device.

19 Claims, 16 Drawing Sheets

MEMORY CONTROLLER FOR CONCURRENTLY WRITING HOST DATA AND GARBAGE COLLECTED DATA AND OPERATING METHOD THEREOF

CROSS-REFERENCE TO RELATED APPLICATION

The present application claims priority to Korean patent application number 10-2018-0008983, filed on Jan. 24, 2018, which is incorporated herein by reference in its entirety.

BACKGROUND

1. Field of Invention

Various embodiments of the present disclosure generally relate to an electronic device. Particularly, the embodiments relate to a memory controller and an operating method thereof.

2. Description of Related Art

Memory devices may be formed in a two-dimensional structure in which strings are arranged horizontally to a semiconductor substrate, or in a three-dimensional structure in which strings are arranged vertically to a semiconductor substrate. A three-dimensional semiconductor memory device is devised in order to overcome the degree of integration limit in two-dimensional semiconductor devices. Such a three-dimensional device may include a plurality of memory cells vertically stacked on a semiconductor substrate. A memory controller may control an operation of the memory device.

SUMMARY

Embodiments provide a memory controller capable of reducing write latency.

Embodiments also provide an operating method of a memory controller capable of reducing write latency.

According to an aspect of the present disclosure, there is provided a memory controller for controlling an operation of a memory device, the memory controller including: a buffer memory configured to store first data received from a host and second data received from the memory device; and a processor configured to control the memory controller to generate a write command for programming the first data and the second data to the memory device.

The second data may be data read from a victim memory block of the memory device.

In response to a write request and the first data received from the host, the processor may store the first data in the buffer memory, select a victim memory block of the memory device, and control an operation of the memory device to generate a read command for reading valid page data stored in the victim memory block.

Data corresponding to the read command may be the second data, and the buffer memory may store the second data.

The processor may control an operation of the memory controller to generate a write command for programming the first data and the second data to the memory device after the second data is stored in the buffer memory.

The processor may generate third data by comparing the first data and the second data, and control an operation of the memory controller to generate a write command for programming the third data to the memory device.

The third data may include data generated by updating the second data, based on the first data.

The third data may include the first data and the second data and be generated by deleting overlapping data in the first data and the second data.

The processor may periodically monitor the memory device and determine whether garbage collection of the memory device is required, and control an operation of the memory controller to read the second data from the victim memory block and store the second data in the buffer memory in response to a determination that the garbage collection of the memory device is required.

In response to a write request and the first data received from the host in a state in which the second data is stored in the buffer memory, the processor may control an operation of the memory controller to generate a write command for programming the first data and the second data to the memory device.

In response to a write request and the first data received from the host in a state in which the second data is stored in the buffer memory, the processor may control an operation of the memory controller to generate third data by comparing the first data and the second data, and generate a write command for programming the third data to the memory device.

According to an aspect of the present disclosure, there is provided a method for operating a memory controller for controlling an operation of a memory device, the method including: receiving first data to be written to the memory device from a host; controlling the memory device to read second data written in a victim memory block of the memory device, as the first data is received; generating a write command to be transferred to the memory device; and controlling the memory device to write third data generated based on the first and second data in a target memory block of the memory device.

The method may further include, after the controlling the memory device to write the third data, controlling the memory device to erase the victim memory block.

The controlling of the memory device to read the second data written in the victim memory block of the memory device may include: selecting, as the victim memory block, at least one memory block in which the number of invalid pages is larger than a set reference value, based on valid and invalid pages written in memory blocks of the memory device; generating a read command for reading valid page data in the victim memory block; transferring the read command to the memory device; and receiving the second data corresponding to the read command.

The third data may include the first and second data.

The third data may include data generated by updating the second data, based on the first data.

According to an aspect of the present disclosure, there is provided a method for operating a memory controller for controlling an operation of a memory device, the method including: determining whether garbage collection is required by monitoring the memory device; in response to a determination that the garbage collection of the memory device is required, selecting a victim memory block of the memory device; controlling the memory device to read first data stored in the memory victim block; receiving second data to be written to the memory device from a host; and controlling the memory device to write third data generated based on the first and second data in a target memory block of the memory device.

The determining of whether the garbage collection is required may include: determining whether the number of free memory blocks in the memory device is less than or equal to a reference value, determining that the garbage collection of the memory device is required when the number of free memory blocks is less than or equal to the reference value, and determining that the garbage collection of the memory device is not required when the number of free memory blocks is greater than the reference value.

In the selecting of the victim memory block of the memory device, at least one memory block in which the number of invalid pages is greater than a set reference value may be selected as the victim memory block.

According to an aspect of the present disclosure, there is provided a memory system including a memory device and a controller. The memory controller is configured to control the memory device to perform a garbage collection operation of moving valid data of a victim memory block into a target memory block in the memory device while performing a write operation of storing write data into the target memory block. The controller gathers, during the garbage collection operation and the write operation, the valid data and the write data in a buffer in the controller and provides the gathered data to the memory device.

BRIEF DESCRIPTION OF THE DRAWINGS

Various embodiments will now be described more fully with reference to the accompanying drawings; however, elements and features of the present invention may be configured or arranged differently than illustrated or described herein. Thus, the present invention is not to be construed as limited to the embodiments set forth herein. Rather, these embodiments are provided so that this disclosure is thorough and complete and fully conveys the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. Also, throughout the specification, reference to "an embodiment" or the like is not necessarily to only one embodiment, and different references to "an embodiment" or the like are not necessarily to the same embodiment(s).

DETAILED DESCRIPTION

Figure 1:
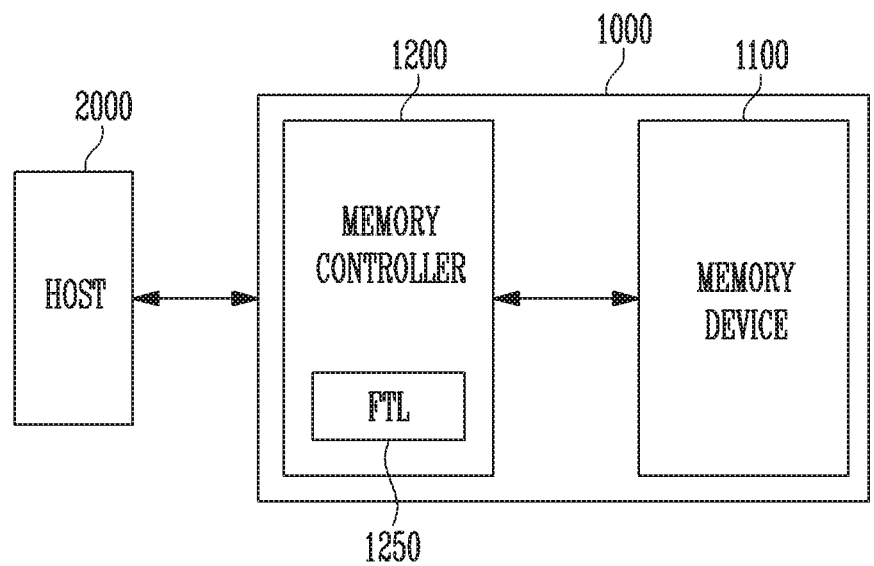
FIG. 1 is a diagram illustrating a memory system including a memory controller according to an embodiment of the present disclosure.

In the following detailed description and accompanying drawings, various embodiments of the present disclosure are shown and described. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed. In addition, when an element is referred to as "including" a component, this indicates that the element may further include one or more additional unstated components unless the context indicates otherwise.

Various embodiments of the present disclosure are described in detail with reference to the accompanying drawings. The same reference numerals are used to designate the same elements as those shown in other drawings. In the following description, known processes and technical detail may be omitted so as to not obscure important concepts of the embodiments.

FIG. 1 is a diagram illustrating a memory system including a memory controller according to an embodiment of the present disclosure.

Referring to FIG. 1, the memory system 1000 may include a memory device 1100 for storing data and a memory controller 1200 for controlling the memory device 1100 under the control of a host 2000.

The host 2000 may communicate with the memory system 1000 by using an interface protocol such as Peripheral Component Interconnect-Express (PCI-E), Advanced Technology Attachment (ATA), Serial ATA (SATA), Parallel ATA (PATA), or Serial Attached SCSI (SAS). Interface protocols between the host 2000 and the memory system 1000 are not limited to the above-described examples; any one of various other interface protocols such as a Universal Serial Bus (USB), a Multi-Media Card (MMC), an Enhanced Small Disk Interface (ESDI), and Integrated Drive Electronics (IDE) may be used.

The memory controller 1200 may control overall operations of the memory system 1000, and control data exchange between the host 2000 and the memory device 1100. For example, the memory controller 1200 may program or read data by controlling the memory device 1100 in response to a request from the host 2000. Also, the memory controller 1200 may store information of main memory blocks and sub-memory blocks, which are included in the memory device 1100, and select the memory device 1100 to perform a program operation on a main memory block or a sub-memory block according to the amount of data loaded for the program operation. In some embodiments, the memory device 1100 may include a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), and a flash memory. Details of an exemplary configuration of the memory controller 1200 are described with reference to FIG. 2. The memory controller 1200 also may be referred as controller.

The memory controller 1200 includes a flash translation layer ('FTL') 1250. The FTL 1250 provides an interface between an external device and the memory device 1100 such that the memory device 1100 is efficiently used. For example, the FTL 1250 may function to translate a logical address received from the external device, e.g., the host 2000 to a physical address used in the memory device 1100. The FTL 1250 may perform the above-described address translation operation through a mapping table. As an example, the logical address indicates a logical position of a storage area, which is managed by the host 2000, and the physical address indicates a physical position of the memory device 1100, which is managed by the memory controller 1200.

The FTL 1250 may perform an operation such as wear-leveling or garbage collection (GC) such that the memory device 1100 can be efficiently used. As an example, the wear-leveling indicates an operation of managing program/erase numbers of a plurality of memory blocks included in the memory device 1100 such that the program/erase numbers of the plurality of memory blocks are equalized. In addition, as an example, the garbage collection indicates an operation of moving valid pages of one or more victim memory blocks, among the plurality of memory blocks in the memory device 1100, to a target memory block and then erasing the victim memory block(s). The target memory block may be a free memory block. The erased victim memory block(s) may then become free block(s) as a result of the garbage collection. The FTL 1250 may secure free blocks of the memory device 1100 by performing the garbage collection.

As an example, the garbage collection may be performed under a specific condition. For example, when the number of free blocks of the memory device 1100 is less than or equal to a reference value, the FTL 1250 may perform the garbage collection.

The memory controller 1200 may receive a write request from the host 2000, and write data DATA to the memory device 1100 in response to the received write request. When the number of free blocks of the memory device 1100 is less than or equal to the reference value during a write operation, the memory controller 1200 may perform the garbage collection to secure free blocks. That is, as the memory controller 1200 performs the garbage collection during the write operation, the write operation may not be continuously performed. Therefore, the write performance of the memory system 1000 may be deteriorated.

A buffer memory 1220 (shown in FIG. 2) of the memory controller 1200 according to an embodiment of the present disclosure stores write request data received from the host 2000 and valid page data stored in a victim memory block of the memory device 1100. A processor 1210 (shown in FIG. 2) of the memory controller 1200 according to an embodiment of the present disclosure temporarily stores the write request data and the valid page data, which are stored in the buffer memory 1220, in a target memory block of the memory device 1100. Accordingly, the garbage collection of the memory device 1100 can be performed together with a write operation of the data received from the host 2000. Consequently, the continuous write operation of the memory system 1000 can be ensured, and write latency of the write request received from the host 2000 can be reduced.

The above-described operation of the memory controller 1200 according to an embodiment of the present disclosure is described in more detail below with reference to FIGS. 4 to 12.

The memory device 1100 may perform a program, read or erase operation under the control of the memory controller 1200. Details of an exemplary configuration and operation of the memory device 1100 are described with reference to FIG. 3.

Figure 2:
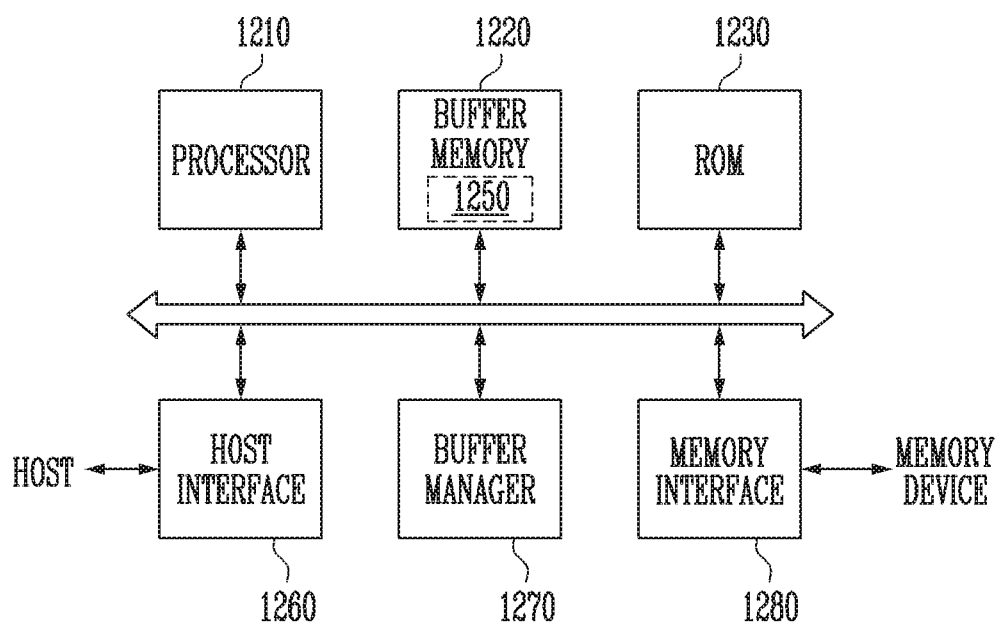
FIG. 2 is a block diagram illustrating detail of the exemplary memory controller of FIG. 1.

FIG. 2 is a block diagram illustrating detail of the memory controller of FIG. 1.

Referring to FIGS. 1 and 2 together, the memory controller 1200 includes the processor 1210, the buffer memory 1220, a ROM 1230, a host interface 1260, a buffer manager 1270, and a memory interface 1280.

The processor 1210 may control overall operations of the memory controller 1200. The buffer memory 1220 may be configured as a working memory of the memory controller 1200, or be used as a cache memory. In an embodiment, the buffer memory 1220 may be configured as an SRAM. The buffer memory 1220 also may be referred as buffer.

As an example, the FTL 1250 may be provided in a software format. In such format, the FTL 1250 may be stored in the buffer memory 1220. The FTL 1250 stored in the buffer memory 1220 may be driven by the processor 1210.

The ROM 1230 may store, as firmware, various information required when the memory controller 1200 operates. The buffer manager 1270 may manage the buffer memory 1220 of the memory controller 1200. For example, data read from the memory device 1100 may be temporarily stored in the buffer memory 1220. Alternatively, write data received from the host 2000 (i.e., data to be programmed to the memory device 1100) may be temporarily stored in the buffer memory 1220.

As an example, a data management unit of the external device, i.e., the host 2000 may be different from that of the memory device 1100. For example, the host 2000 may manage data in units of sectors. That is, the host 2000 may write and read data in sector units. On the other hand, the memory device 1100 may manage data in units of pages. That is, the memory device 1100 may perform an operation in units of pages in response to the request from the host 2000. As an example, the page unit may be larger than the sector unit. In a write operation, the buffer manager 1270 may rearrange the data in sector units into units of pages such that the received data can be written to the memory device 1100.

The memory controller 1200 may communicate with the external device (or the host 2000) through the host interface 1260. As an example, the host interface 1260 may include at least one of various interfaces such as a Universal Serial Bus (USB), a Multi-Media Card (MMC), an embedded MMC (eMMC), a Peripheral Component Interconnection (PCI), a PCI-Express (PCI-E), an Advanced Technology Attachment (ATA), a Serial-ATA (SATA), a Parallel-ATA (PATA), a Small Computer Small Interface (SCSI), an Enhanced Small Disk Interface (ESDI), Integrated Drive Electronics (IDE), Firewire, and a Universal Flash Storage (UFS).

The memory controller 1200 may communicate with the memory device 1100 through the memory interface 1280. As an example, the memory interface 1280 may include a NAND interface.

As an example, a write request and a read request, which are received from the host 2000, may be commands or signals defined by the host interface 1260. A write command and a read command, which are provided from the memory controller 1200 to the memory device 1100, may be commands or signals defined by the memory interface 1280.

Although not shown in FIG. 2, the memory controller 1200 may further include components such as a randomizer for data randomizing and an error correction circuit for data error correction.

Figure 3:
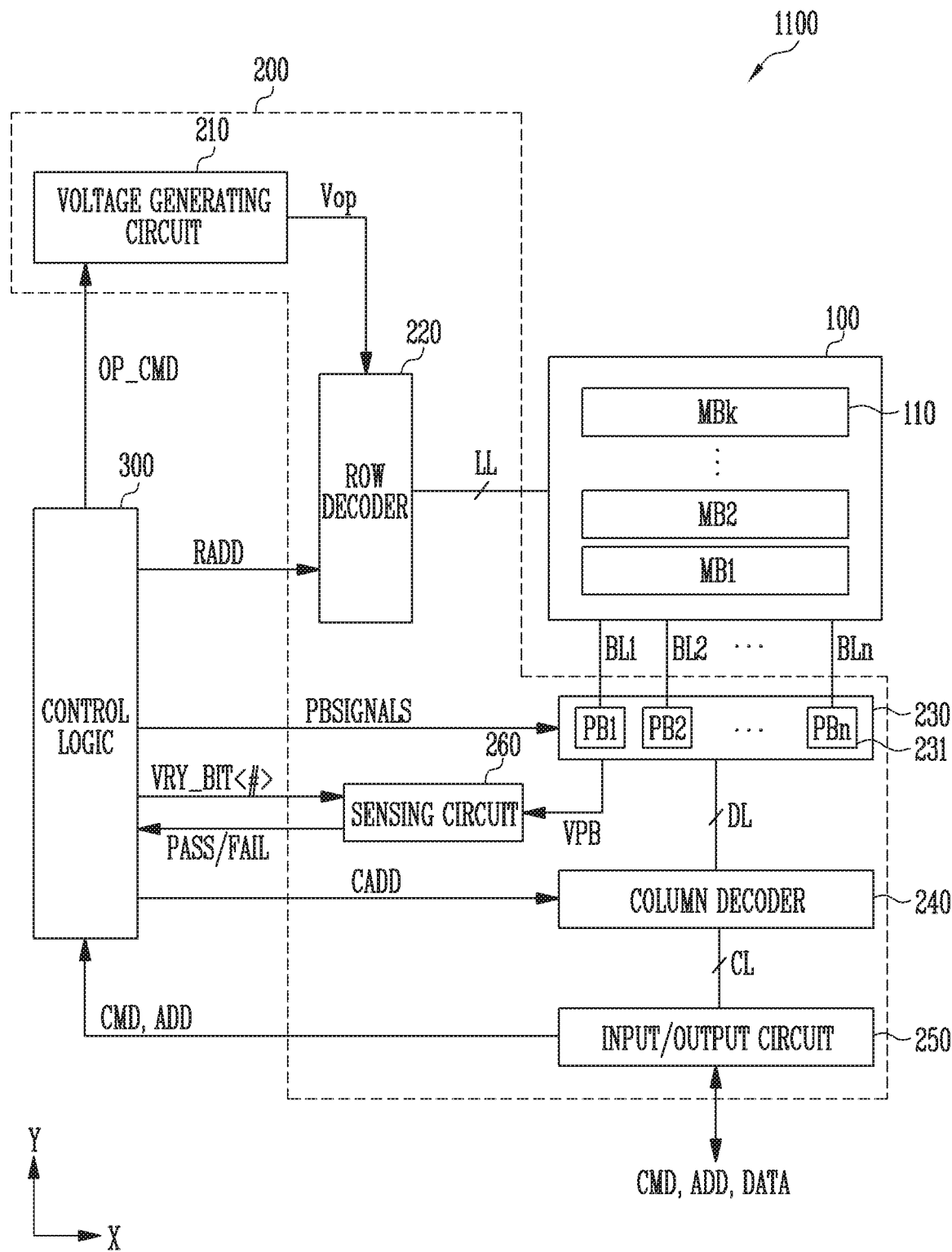
FIG. 3 is a diagram illustrating a memory device of FIG. 1.

FIG. 3 is a diagram illustrating a memory device of FIG. 1.

Referring to FIG. 3, the memory device 1110 may include a memory cell array 100 that stores data. The memory device 1110 may include peripheral circuits 200 configured to perform a program operation for storing data in the memory cell array 100, a read operation for outputting the stored data, and an erase operation for erasing the stored data. The memory device 1110 may include a control logic 300 that controls the peripheral circuits 200 under the control of the memory controller 1200.

The memory cell array 100 may include a plurality of memory blocks MB1 to MBk (k is a positive integer) 110. Local lines LL and bit lines BL1 to BLn (n is a positive integer) may be coupled to the memory blocks MB1 to MBk 110. For example, the local lines LL may include a first select line, a second select line, and a plurality of word lines arranged between the first and second select lines. Also, the local lines LL may further include dummy lines arranged between the first select line and the word lines and between the second select line and the word lines. The first select line may be a source select line, and the second select line may be a drain select line. For example, the local lines LL may include word lines, drain and source select lines, and source lines SL. For example, the local lines LL may further include dummy lines. For example, the local lines LL may further include pipe lines. The local lines LL may be coupled to the memory blocks MB1 to MBk 110, respectively, and the bit lines BL1 to BLn may be commonly coupled to the memory blocks MB1 to MBk 110. The memory blocks MB1 to MBk 110 may be implemented in a two-dimensional or three-dimensional structure. For example, memory cells may be arranged in a direction parallel to a substrate in memory blocks 110 having a two-dimensional structure. For example, memory cells may be arranged in a direction vertical to a substrate in memory blocks 110 having a three-dimensional structure.

The peripheral circuits 200 may be configured to perform program, read, and erase operations of a selected memory block 110 under the control of the control logic 300. For example, the peripheral circuits 200, under the control of the control logic 300, may supply verify and pass voltages to the first select line, the second select line, and the word lines, selectively discharge the first select line, the second select line, and the word lines, and verify memory cells coupled a selected word line among the word lines. For example, the peripheral circuits 200 may include a voltage generating circuit 210, a row decoder 220, a page buffer group 230, a column decoder 240, an input/output circuit 250, and a sensing circuit 260.

The voltage generating circuit 210 may generate various operating voltages Vop used for program, read, and erase operations in response to an operation signal OP_CMD. Also, the voltage generating circuit 210 may selectively discharge the local lines LL in response to the operation signal OP_CMD. For example, the voltage generating circuit 210 may generate a program voltage, a verify voltage, pass voltages, a turn-on voltage, a read voltage, an erase voltage, a source line voltage, and the like under the control of the control logic 300.

The row decoder 220 may transfer the operating voltages Vop to local lines LL coupled to a selected memory block 110 in response to a row address RADD.

The page buffer group 230 may include a plurality of page buffers PB1 to PBn 231 coupled to the bit lines BL1 to BLn. The page buffers PB1 to PBn 231 may operate in response to page buffer control signals PBSIGNALS. For example, the page buffers PB1 to PBn 231 may temporarily store data received through the bit lines BL1 to BLn, or sense voltages or current of the bit lines BL1 to BLn in a read or verify operation.

The column decoder 240 may transfer data between the input/output circuit 250 and the page buffer group 230 in response to a column address CADD. For example, the column decoder 240 may exchange data with the page buffers 231 through data lines DL, or exchange data with the input/output circuit 250 through column lines CL.

The input/output circuit 250 may transfer a command CMD and an address ADD, which are received from the memory controller 1200, to the control logic 300, or communicate data DATA with the column decoder 240.

In a read operation or verify operation, the sensing circuit 260 may generate a reference current in response to a permission bit VRY_BIT<#>, and output a pass signal PASS or a fail signal FAIL by comparing a sensing voltage VPB received from the page buffer group 230 with a reference voltage generated by the reference current.

The control logic 300 may control the peripheral circuits 200 by outputting the operation signal OP_CMD, the row address RADD, the column address CADD, the page buffer control signals PBSIGNALS, and the permission bit VRY_BIT<#> in response to the command CMD and the address ADD. Also, the control logic 300 may determine whether the verify operation has passed or failed in response to the pass or fail signal PASS or FAIL.

Figure 4:
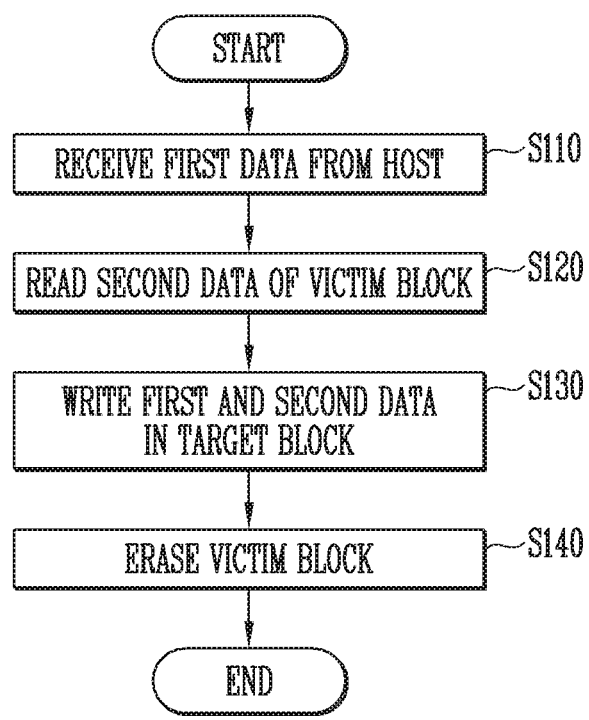
FIG. 4 is a flowchart illustrating an operating method of the memory controller according to an embodiment of the present disclosure.

FIG. 4 is a flowchart illustrating an operating method of the memory controller 1200 according to an embodiment of the present disclosure. Such operation of the memory controller 1200 now will be described with reference to FIGS. 1, 2, and 4 together.

In step S110, the memory controller 1200 receives first data from the host 2000. The first data is received together with a write request from the host 2000, and may be data to be written to the memory device 1100. The received first data may be temporarily stored in the buffer memory 1220.

In step S120, second data of a victim memory block is read. The second data may have already been written in the victim memory block of the memory device 1100. More specifically, the second data may be valid page data stored in the victim memory block on which a garbage collection operation is to be performed.

In step S130, the first data and the second data are written in a target memory block. The target memory block may be selected as a migration destination of the valid page data of the victim memory block in the garbage collection operation. As an example, the target memory block may be selected from free blocks among the memory blocks of the memory device 1100. The "free block" may mean a memory block in which no data is stored after an erase operation. Additionally, the memory controller 1200 may update a mapping table such that, after valid page data of the victim memory block is moved to the target memory block, a physical address of the valid page data is updated. As described above, the mapping table functions to translate a logical address received from the host 2000 to a physical address used in the memory device 1100. While the logical address of the second data is not changed, the physical address of the second data is changed. Therefore, the memory controller 1200 may update the mapping table to reflect the changed physical address from the victim memory block to the target memory block.

In step S140, the victim memory block is erased. The valid page data, i.e., the second data that has been stored in the victim memory block is moved to the target memory block. Therefore, no valid page exists; only invalid pages exist. Accordingly, as the victim memory block is erased, a free block can be secured.

Figure 5:
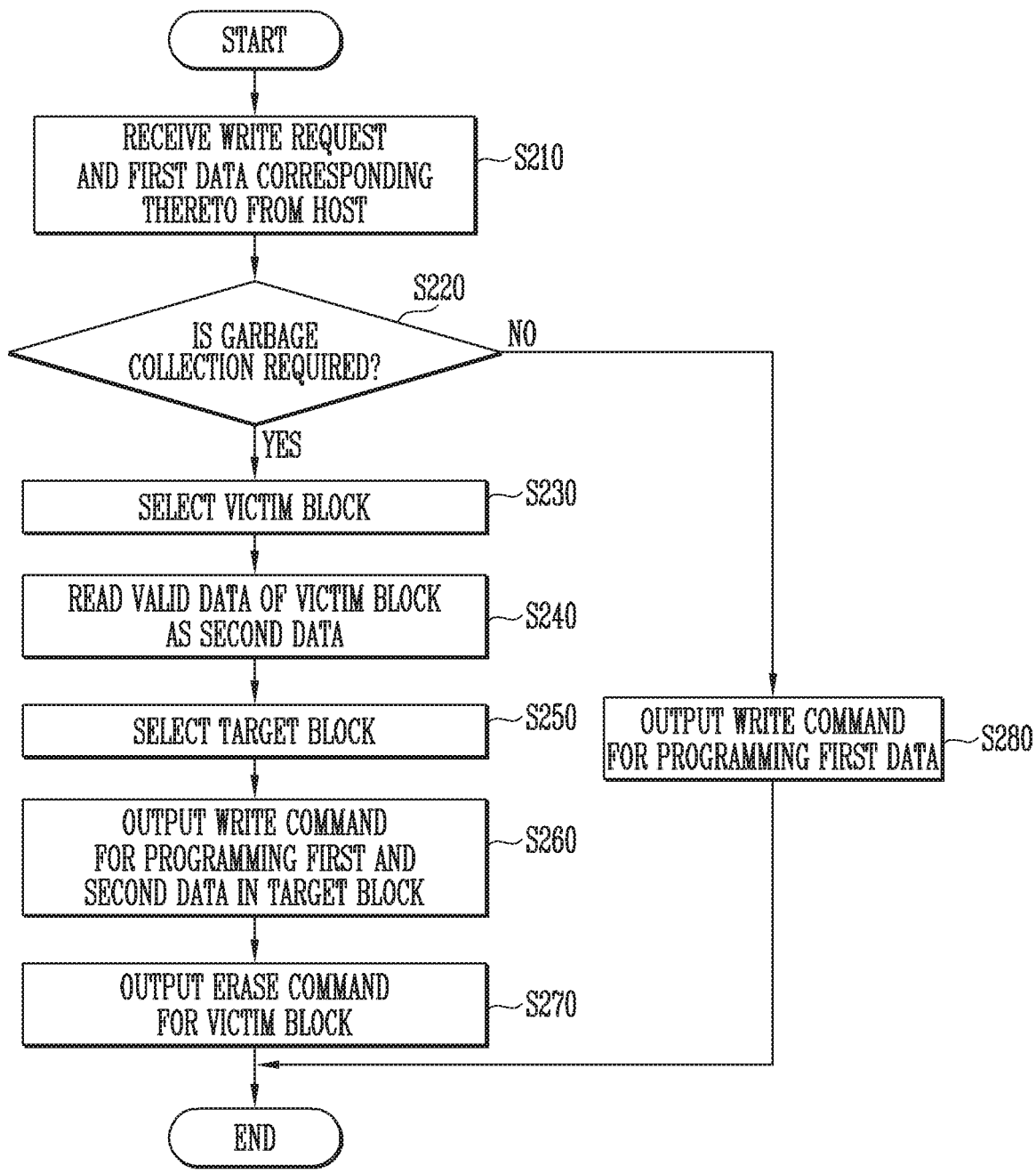
FIG. 5 is a flowchart illustrating in more detail an operating method of the memory controller according to an embodiment of the present disclosure.

FIG. 5 is a flowchart illustrating in more detail an operating method of the memory controller 1200 according to an embodiment of the present disclosure.

In step S210, the memory controller 1200 receives a write request and first data corresponding thereto from the host 2000. As described above, the first data is data received together with the write request from the host 2000, and may be data to be written to the memory device 1100. The received first data may be temporarily stored in the buffer memory 1220.

In step S220, the memory controller 1200 determines whether garbage collection of the memory device 1100 is required. In an embodiment, whether the garbage collection is required may be determined based on whether the number of free blocks among the memory blocks in the memory block 1100 is a certain number or less. When the number of free blocks is less than or equal to a set or predetermined reference value, there may not be enough free blocks on which to perform a write operation. Accordingly, when the number of free blocks is less than or equal to the set or predetermined reference value, the memory controller 1200 determines that the garbage collection is required. On the other hand, when the number of free blocks is greater than the set or predetermined reference value, the memory controller 1200 determines that the garbage collection is not required yet.

When the garbage collection is required, the memory controller 1200 selects a victim memory block in step S230. The victim memory block is selected among the other blocks, excluding free blocks in which no data is written yet, among all of the memory blocks in the memory device 110. In an embodiment, the victim memory block may be selected based on whether the number of invalid pages in the respective memory blocks is greater than or equal to a certain number so as to perform efficient garbage collection. For example, when the number of invalid pages in a memory block is small, this is indicative of a situation in which the number of valid pages is large or a situation in which the number of free pages is large. Either way, it is less likely that such memory block will be selected as the victim memory block. On the other hand, when a memory block in which the number of valid pages is small and the number of invalid pages is large is selected as the victim memory block, the number of pages changed to free pages as a result of the garbage collection is relatively large, thereby improving efficiency. The number of victim memory blocks selected in the step S230 may be one or more.

In step S240, valid data of the victim memory block is read as second data. Data stored in valid pages in the selected victim memory block is the valid data. The valid data is read as the second data, and the read second data may be temporarily stored together with the first data in the buffer memory 1220.

In step S250, the memory controller 1200 selects a target memory block as a migration destination of valid page data of the victim memory block in a garbage collection operation. As an example, the target memory block may be a memory block selected from free blocks among the memory blocks of the memory device 1100.

In step S260, a write command for programming the first data and the second data, which are stored in the buffer memory 1220, in the selected target memory block is transferred from the memory controller 1200 to the memory device 1100. Accordingly, the memory device 1100 writes the first and second data in the target memory block instead of the victim memory block.

As the step S260 is performed, a write operation of writing the first data received from the host 2000 to the memory device 1100 and a garbage collection operation of moving the second data stored in the victim memory block to the target memory block are simultaneously performed. Accordingly, the garbage collection operation of the memory device 1100 is performed together with the write operation of the data received from the host 2000. Consequently, the continuous write operation of the memory system 1000 can be ensured, and write latency of the write request received from the host 2000 can be reduced.

Subsequently, in step S270, an erase command for the victim memory block is transferred from the memory controller 1200 to the memory device 1100. Accordingly, the victim memory block is erased and thus becomes a free block. The time when the step S270 is performed may be changed depending on whether an additional write request has been received from the host 2000. That is, when an additional write request is pending after the step S260 is performed, the additional write request is first processed without first erasing the victim memory block. When no additional write request is pending after the step S260 is performed, the victim memory block is erased. Accordingly, the operation speed of the memory system 1000 can be improved.

Returning to step S220, when it is determined that the garbage collection is not required, the method proceeds to step S280, at which the memory controller 1200 outputs a write command for programming the first data received from the host 2000 to the memory device 1100. Therefore, the garbage collection is not performed, and the first data received from the host 2000 is immediately written to the memory device 1100.

FIGS. 6A to 6E are block diagrams illustrating an operating method of the memory controller according to an embodiment of the present disclosure. The method shown in FIGS. 4 and 5 is described with reference to FIGS. 6A to 6E.

Referring to FIGS. 6A to 6E, the memory controller 1200 and the memory device 1100 are illustrated. For clarity of illustration, the host 2000 is omitted from these figures. The memory controller 1200 includes the buffer memory 1220, and may also include other components shown in FIG. 2. These other components of the memory controller 1200 are omitted from FIGS. 6A to 6E for clarity. In FIGS. 6A to 6E, the memory device 1100 includes four memory blocks 110a, 110b, 110c, and 110d, but it will be understood that the memory device 1100 may include a larger number of memory blocks. Similarly, in FIGS. 6A to 6E, each of the memory blocks 110a, 110b, 110c, and 110d includes five pages, but it will be understood that each of the memory blocks 110a, 110b, 110c, and 110d may include a larger number of pages.

The memory block 110a includes two valid pages and three invalid pages. Valid page data Data1 and Data2 are stored in the memory block 110a. The memory block 110b includes three valid pages and two invalid pages. Valid page data Data3, Data4, and Data5 are stored in the memory block 110b. The memory block 110c includes one valid page and four invalid pages. Valid data Data6 is stored in the memory block 110c. No data is stored in the memory block 110d, and hence it is a free block.

Figure 6A:
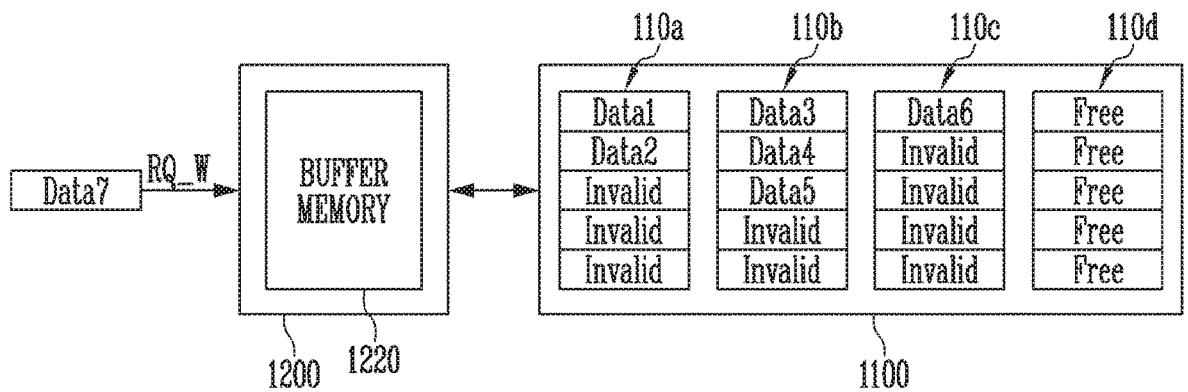
FIGS. 6A to 6E are block diagrams illustrating an operating method of the memory controller according to an embodiment of the present disclosure.

In FIG. 6A, data Data7 and a write request RQ_W corresponding thereto are transferred from the host 2000 to the memory controller 1200. As shown in FIG. 5, the memory controller 1200 determines whether the garbage collection is required (S220). In FIG. 6A, since one free block exists, it is determined that the garbage collection is required.

Figure 6B:
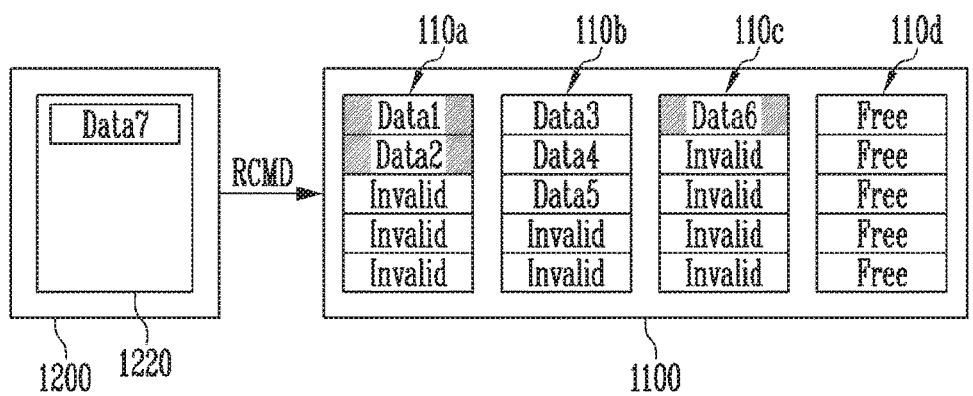

In FIG. 6B, the received data Data7 is stored as first data in the buffer memory 1220 of the memory controller 1200. The memory controller 1200 selects a victim memory block among the memory blocks 110a, 110b, 110c, and 110d of the memory device 1100. As described above, when the number of invalid pages in a memory block is greater than or equal to a certain reference value, the memory block may be selected as the victim memory block. As an example, in FIG. 6B, it is illustrated that, when the number of invalid pages among the five pages in a memory block is three or more, the memory block is selected as the victim memory block. Accordingly, the memory blocks 110a and 110c each including three or more invalid pages are selected as victim memory blocks. Therefore, valid page data Data1, Data2, and Data6 written in the victim memory blocks 110a and 110c become the second data described in FIGS. 4 and 5.

The memory controller 1200 transfers, to the memory device 1100, a read command for the second data, i.e., the valid page data Data1, Data2, and Data6 stored in the memory blocks 110a and 110c selected as the victim memory blocks.

Figure 6C:
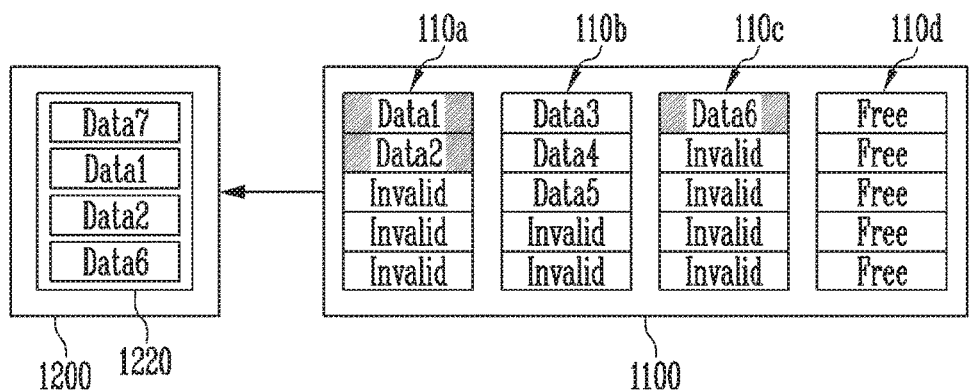

Referring to FIG. 6C, as the read command RCMD is received, the second data stored in the memory device 1100, i.e., the valid page data Data1, Data2, and Data6 of the victim memory blocks, are read and transferred to the memory controller 1200. The transferred data may be stored in the buffer memory 1220. Accordingly, the data Data7 that is the first data received form the host 2000 and the data Data1, Data2, and Data6 that is the second data from the victim memory blocks are stored in the buffer memory 1220.

Figure 6D:
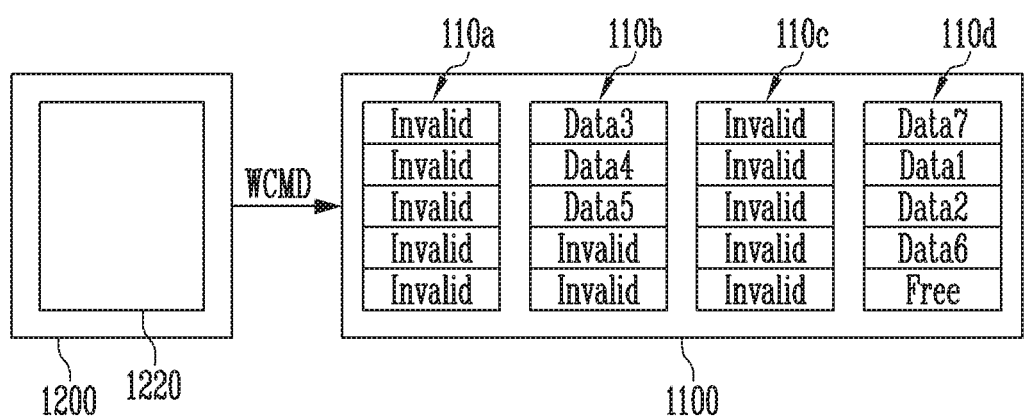

Referring to FIG. 6D, the memory controller 1200 selects the memory block 110d, which is the free block, as a target memory block. Also, the memory controller 1200 generates a write command WCMD for writing, in the target memory block, the first and second data stored in the buffer memory 1220 and transfers the generated write command WCMD to the memory device 1100. The data Data7, Data1, Data2, and Data6 along with the write command WCMD may also be transferred to the memory device 1100. Accordingly, the memory device 1100 writes the received data Data7, Data1, Data2, and Data6 in the memory block 110d, which is the target memory block. As the valid page data Data1, Data2, and Data6 are written in the target memory block, the data stored in the memory blocks 110a and 110c, which are the victim memory blocks, becomes invalid.

Figure 6E:
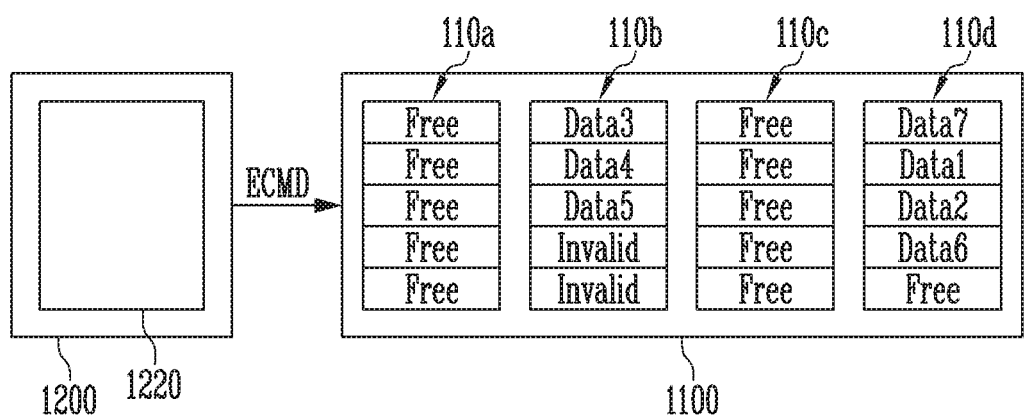

Referring to FIG. 6E, the memory controller 1200 transfers, to the memory device 1100, an erase command ECMD for erasing the memory blocks 110a and 110c, which have become the victim memory blocks. As the erase command ECMD is received, the memory device 1100 erases the memory blocks 110a and 110c. Accordingly, the memory blocks 110a and 110c are changed to free blocks.

As shown in FIGS. 6A to 6E, in the memory controller and the operating method thereof according to an embodiment of the present disclosure, a garbage collection operation of the memory device 1100 is performed together with a write operation of data received from the host 2000. Consequently, the continuous write operation of the memory system 1000 can be ensured, and write latency of the write request received from the host 2000 can be reduced.

The operating method of the memory controller according to an embodiment of the present disclosure may be more preferably applied to data having small chunk sizes. As an example, an operating method of the memory controller according to an embodiment of the present disclosure may be applied to Reply Protected Memory Blocks (RPMBs).

Figure 7:
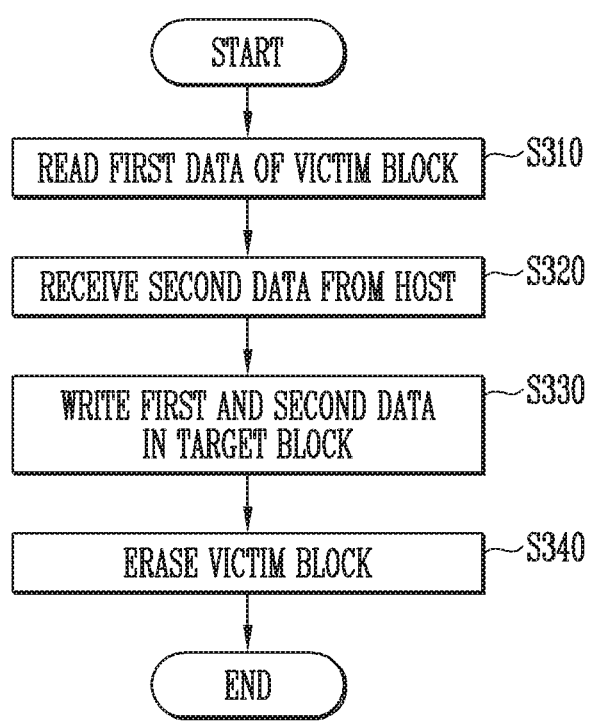
FIG. 7 is a flowchart illustrating an operating method of the memory controller according to another embodiment of the present disclosure.

FIG. 7 is a flowchart illustrating an operating method of the memory controller according to another embodiment of the present disclosure. An operation of the memory controller 1200 now will be described with reference to FIGS. 1, 3, and 7 together.

In step S310, the memory controller 1200 reads first data of a victim memory block in the memory device 1100. The first data has already been stored in the victim memory block, and may be valid page data on which a garbage collection operation is to be performed. The read first data may be temporarily stored in the buffer memory 1220.

In step S320, the memory controller 1200 receives second data from the host 2000. The second data is data received together with a write request from the host 2000, and may be data to be written to the memory device 1100. The received second data may be temporarily stored in the buffer memory 1220.

In step S330, the memory controller 1200 writes the first and second data in a target memory block. The target memory block may be selected as a migration destination of the valid page data of the victim memory block in the garbage collection operation. As an example, the target memory block may be a memory block selected from free blocks among the memory blocks of the memory device 1100.

In step S340, the memory controller 1200 erases the victim memory block. Since the valid page data, i.e., the first data that has been stored in the victim memory block, is moved to the target memory block, no valid page exists; only invalid pages exist. Accordingly, as the victim memory block is erased, a free block can be secured.

When comparing FIGS. 4 and 7, in the embodiment of FIG. 4, the memory controller 1200 first receives the first data from the host (see S110) and then reads the second data of the victim memory block (S120). On the other hand, in the embodiment of FIG. 7, the memory controller 1200 first reads the first data of the victim memory block (S310) and then receives the second data from the host (see S320). According to the embodiment of FIG. 7, the memory controller 1200 selects a victim memory block on which garbage collection is to be performed before a write request and write data are received from the host 2000, reads, in advance, valid page data stored in the selected victim memory block and then stores the read valid page data in the buffer memory device 1220. According to the embodiment of FIG. 7, when the write request and the write data are received from the host 2000, the memory controller 1200 immediately writes, in the target memory block of the memory device 1100, valid page data that has already been stored in the buffer memory and the write data received from the host. Accordingly, the time from when the write request is received from the host 2000 to when a write operation is completed is reduced. Consequently, the operation speed of the memory system 1000 can be improved.

Figure 8:
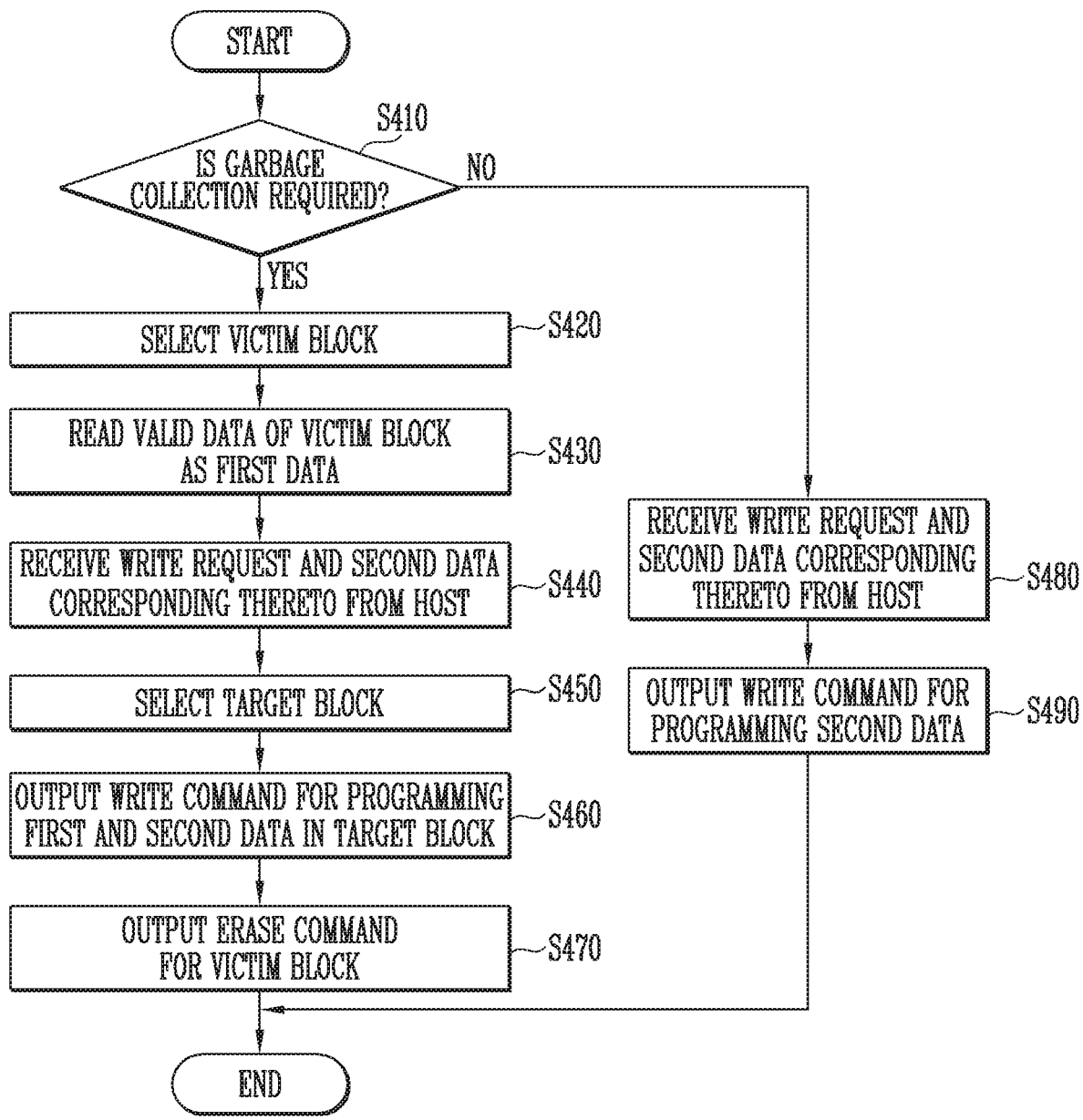
FIG. 8 is a flowchart illustrating in more detail the operating method of the memory controller according to the embodiment of FIG. 7.

FIG. 8 is a flowchart illustrating in more detail an operating method of the memory controller according to the another embodiment of the present disclosure.

In step S410, the memory controller 1200 determines whether garbage collection of the memory device 1100 is required. Particularly, in the step S410, the memory controller 1200 may repeatedly determine when the garbage collection is required by periodically monitoring the memory device 1100. As described above, whether the garbage collection is required may be determined based on whether the number of free blocks among the memory blocks in the memory block 1100 is less than or equal to a certain number.

When the garbage collection is required, as determined in step S410, the memory controller 1200 selects a victim memory block in step S420. As an example, the victim memory block may be selected based on whether the number of invalid pages among the memory blocks is greater than or equal to a certain number. The number of victim memory blocks selected in the step S420 may be one or more.

In step S430, the memory controller 1200 reads valid data of the victim memory block as first data. Data stored in valid pages in the selected victim memory block is the valid data. The valid data is read as the first data, and the read first data may be temporarily stored in the buffer memory 1220.

In step S440, the memory controller 1200 receives from the host 2000 a write request and second data corresponding thereto. The step S440 may not be immediately performed after the step S430 is performed. There may be a waiting period for receiving a request from the host 2000 after the step S430 is performed.

As described above, the second data is data received together with the write request from the host 2000, and may be data to be written to the memory device 1100. The received second data may be temporarily stored together with the first data in the buffer memory 1220.

In step S450, the memory controller 1200 selects a target memory block as a migration destination of valid page data of the victim memory block in a garbage collection operation. As an example, the target memory block may be a memory block selected from free blocks among the memory blocks of the memory device 1100.

In step S460, a write command for programming the first data and the second data, which are stored in the buffer memory 1220, in the selected target memory block is transferred from the memory controller 1200 to the memory device 1100. The first and second data along with the write command may also be transferred to the memory device 1100. Accordingly, the memory device 1100 writes the first and second data in the target memory block instead of the victim memory block.

As the step S460 is performed, a garbage collection operation of moving the first data stored in the victim memory block of the memory device 1100 to the target memory block and a write operation of writing the second data received from the host 2000 to the memory device 1100 are simultaneously performed. Accordingly, the garbage collection operation of the memory device 1100 is performed together with the write operation of the data received from the host 2000. Consequently, the continuous write operation of the memory system 1000 can be ensured, and write latency of the write request received from the host 2000 can be reduced.

Subsequently, in step S470, an erase command for the victim memory block is transferred from the memory controller 1200 to the memory device 1100. Accordingly, the victim memory block is erased and thus becomes a free block. The time when the step S470 is performed may be changed depending on whether an additional write request has been received from the host 2000. That is, when an additional write request is pending after the step S460 is performed, the additional write request is first processed without erasing the victim memory block. When no additional write request is pending after the step S460 is performed, the victim memory block is erased. Accordingly, the operation speed of the memory system 1000 can be improved.

Returning to the step S410, when it is determined the garbage collection is not required, the memory controller 1200 receives from the host a write request and second data corresponding thereto in step S480. The step S480 may not be immediately performed after the step S410 is performed. There may be a waiting period for receiving a request from the host 2000 after the step S410 is performed. Subsequently, in step S490, a write command for programming the received second data is output from the memory controller 1200 to the memory device 1100. Consequently, as the steps S410, S480, and S490 are performed, the second data received from the host 2000 can be written to the memory device 1100 without performing the garbage collection.

As described above, according to the embodiment of FIG. 8, before a write request and write data are received from the host 2000 (S440), the memory controller 1200 selects a victim memory block on which the garbage collection is to be performed (S420), reads, in advance, valid page data stored in the selected victim memory block (S430), and stores the read valid page data in the buffer memory 1220. Subsequently, when the write request and the write data are received from the host 2000 (S440), the memory controller 1200 immediately writes, in the target memory block of the memory device 1100, the valid page data (i.e., the first data) that has already been stored in the buffer memory 1220 and the write data (i.e., the second data) received from the host (S460). Accordingly, the time from when the write request is received from the host 2000 to when a write operation is completed is reduced. Consequently, the operation speed of the memory system 1000 can be improved.

FIGS. 9A to 9F are block diagrams illustrating the operating method of the memory controller according to the embodiment of FIG. 7. The method shown in FIGS. 7 and 8 will be described with reference to FIGS. 9A to 6F.

Referring to FIGS. 9A to 9F, the memory controller 1200 and the memory device 1100 are illustrated. For ease of illustration, the host 2000 is omitted. The memory controller 1200 includes the buffer memory 1220. Other components of the memory controller 1200 are omitted for clarity.

Valid and invalid pages stored in each of the memory blocks 110a to 110d are the same as described in FIG. 6A.

Figure 9A:
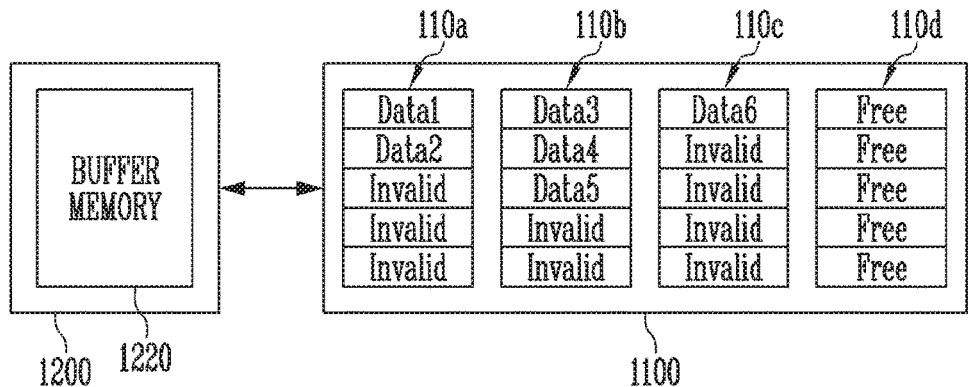
FIGS. 9A to 9F are block diagrams illustrating the operating method of the memory controller according to the embodiment of FIG. 7.

In FIG. 9A, the memory controller 1200 determines whether garbage collection is required (S410). In FIG. 9A, since one free block exists, it is determined that the garbage collection is required.

Figure 9B:
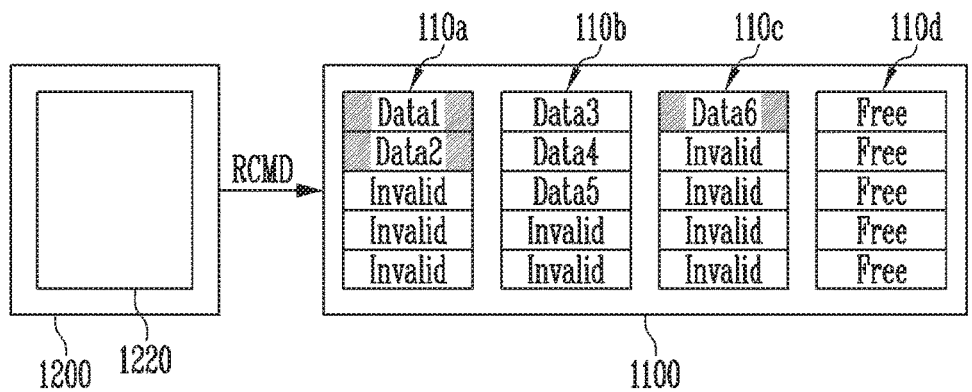

In FIG. 9B, the memory controller 1200 selects a victim memory block among the memory blocks 110a, 110b, 110c, and 110d of the memory device 1100. As an example, in FIG. 9B, it is illustrated that, when the number of invalid pages among the five pages in a memory block is three or more, the memory block is selected as the victim memory block. Accordingly, the memory blocks 110a and 110c, each including three or more invalid pages, are selected as victim memory blocks. Therefore, valid page data Data1, Data2, and Data6 written in the victim memory blocks 110a and 110c become the first data described in FIGS. 7 and 8.

The memory controller 1200 transfers, to the memory device 1100, a read command for the first data, which is the valid page data Data1, Data2, and Data6 stored in the memory blocks 110a and 110c selected as the victim memory blocks.

Referring to FIG. 6C, as the read command RCMD is received, the first data stored in the memory device 1100, i.e., the valid page data Data1, Data2, and Data6 of the victim memory blocks are read and transferred to the memory controller 1200. The transferred data may be stored in the buffer memory 1220. Accordingly, data Data7, which is second data received from the host 2000, and the data Data1, Data2, and Data6, which is the first data from the victim memory blocks, are stored in the buffer memory 1220.

Figure 9C:
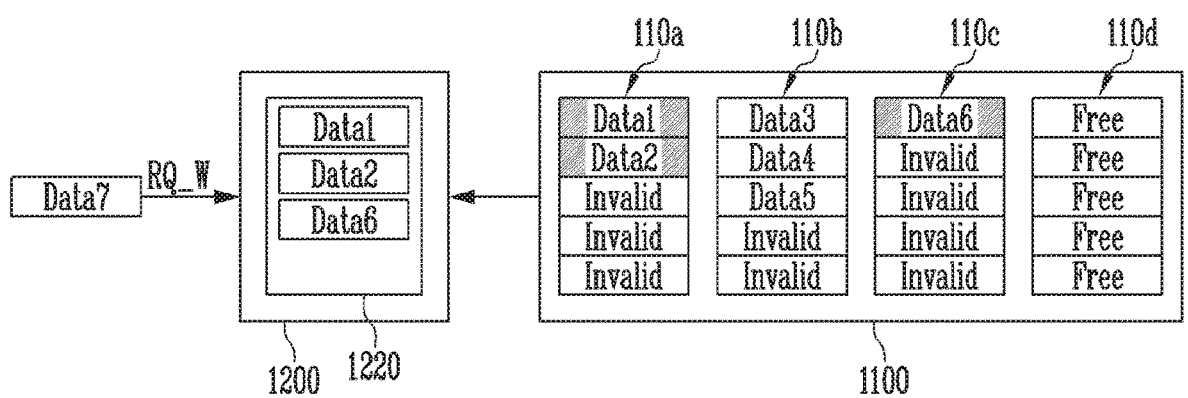
Figure 9D:
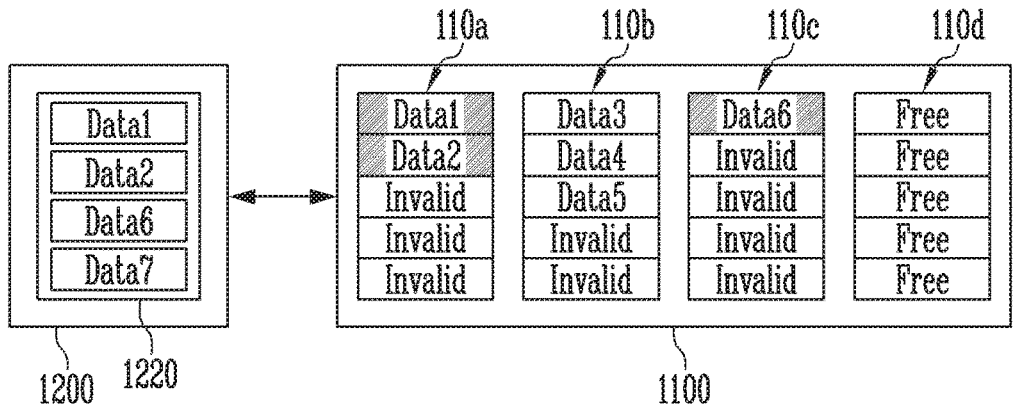

Referring to FIG. 9C, the data Data7 and a write request RQ_W corresponding thereto are transferred from the host 2000 to the memory controller 1200. Referring to FIG. 9D, the received data Data7 is stored as the second data in the buffer memory 1220 of the memory controller 1200.

Figure 9E:
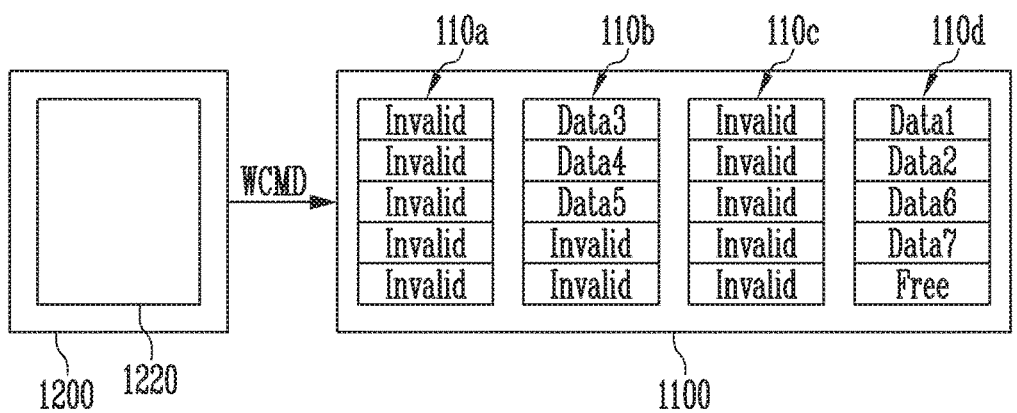

Referring to FIG. 9E, the memory controller 1200 selects the memory block 110d, which is the free block, as a target memory block. Also, the memory controller 1200 generates a write command WCMD for writing, in the target memory block, the first and second data stored in the buffer memory 1220 and transfers the generated write command WCMD to the memory device 1100. The data Data1, Data2, Data6, and Data7 along with the write command WCMD may also be transferred to the memory device 1100. Accordingly, the memory device 1100 writes the received data Data1, Data2, Data6, and Data7 in the memory block 110d, which is the target memory block. As the valid page data Data1, Data2, and Data6, which become the first data, are written in the target memory block, the data stored in the memory blocks 110a and 110c, which are the victim memory blocks, becomes invalid.

Figure 9F:
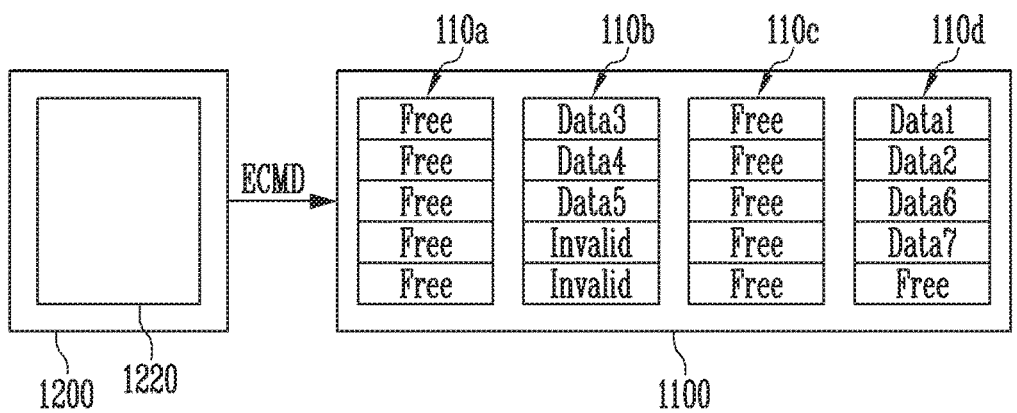

Referring to FIG. 9F, the memory controller 1200 transfers, to the memory device 1100, an erase command ECMD for erasing the memory blocks 110a and 110c, which have become the victim memory blocks. As the erase command ECMD is received, the memory device 1100 erases the memory blocks 110a and 110c. Accordingly, the memory blocks 110a and 110c are changed to free blocks.

As shown in FIGS. 9A to 9F, in the memory controller and the operating method thereof according to an embodiment of the present disclosure, a garbage collection operation of the memory device 1100 is performed together with a write operation of data received from the host 2000. Consequently, the continuous write operation of the memory system 1000 can be ensured, and write latency of the write request received from the host 2000 can be reduced.

In addition, according to the embodiment shown in FIGS. 9A to 9F, before a write request and write data are received from the host 2000 (S440), the memory controller 1200 selects a victim memory block on which the garbage collection is to be performed (see S420), reads, in advance, valid page data stored in the selected victim memory block (S430), and stores the read valid page data in the buffer memory 1220. Subsequently, when the write request and the write data are received from the host 2000 (S440), the memory controller 1200 immediately writes, in the target memory block of the memory device 1100, the valid page data (i.e., the first data) that has already been stored in the buffer memory 1220 and the write data (i.e., the second data) received from the host (see S460). Accordingly, the time from when the write request is received from the host 2000 to when a write operation is completed is reduced. Consequently, the operation speed of the memory system 1000 can be improved.

Figure 10:
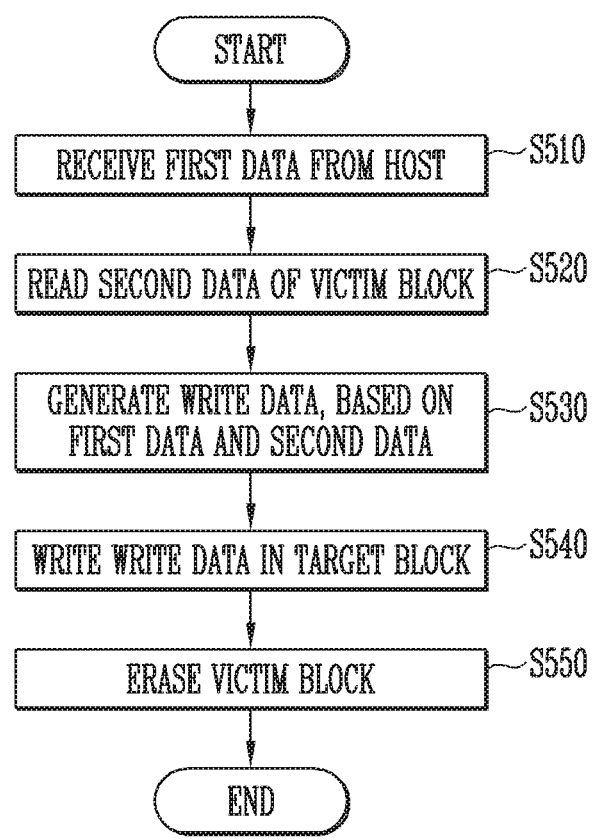
FIG. 10 is a flowchart illustrating an operating method of the memory controller according to still another embodiment of the present disclosure.

FIG. 10 is a flowchart illustrating an operating method of the memory controller according to still another embodiment of the present disclosure. An operation of the memory controller 1200 now will be described with reference to FIGS. 1, 2, and 10 together.

In step S510, the memory controller 1200 receives first data from the host 2000. The first data is data received together with a write request from the host 2000, and may be data to be written to the memory device 1100. The received first data may be temporarily stored in the buffer memory 1220.

In step S520, the memory controller 1200 reads second data of a victim memory block. The second data has already been written to and stored in the victim memory block of the memory device 1100, and may be stored valid page data.

In step S530, the memory controller 1200 generates write data, based on the first data and the second data. The write data may include the first data and the second data. The case where the write data simply includes the first data and the second data has been described with reference to FIGS. 6A to 6E and 9A to 9F.

When the first data and the second data partially overlap, or when a portion of the first data is for updating a portion of the second data, the write data may be generated by modifying or correcting the first data and the second data. For example, when the first data and the second data partially have the same content, the write data may be data that includes the first data and the second data, in which the overlapping content is deleted.

For example, when a portion of the first data is for updating a portion of the second data, the write data may be data including the updated second data. An example in which the write data is generated based on the first data and the second data will be described in detail with reference to FIGS. 11A to 11F.

In step S540, the memory controller 1200 writes the generated write data in a target memory block. The target memory block may be selected as a migration destination of valid page data in a garbage collection operation, and a free block may be selected as the target memory block. Additionally, the memory controller 1200 may update a mapping table such that physical data of the valid page data is updated after the valid page data is written in the target memory block.

In step S550, the memory controller 1200 erases the victim memory block. Since the valid page data, i.e., the second data, that has been stored in the victim memory block through the steps S510 to S540 is written in the target memory block, no valid page exists; only invalid pages exist. Accordingly, as the victim memory block is erased, a free block can be secured.

FIGS. 11A to 11F are block diagrams illustrating the operating method of the memory controller according to the embodiment of FIG. 10. The method shown in FIG. 10 is described with reference to FIGS. 11A to 11F.

Referring to FIGS. 11A to 11F, the memory controller 1200 and the memory device 1100 are illustrated. For clarity of illustration, the host 2000 is omitted from these figures. The memory controller 1200 includes the buffer memory 1220, and may include other components shown in FIG. 2. Such other components of the memory controller 1200 are omitted here for clarity.

Valid and invalid pages stored in each of the memory blocks 110a to 110d are the same as described in FIG. 6A.

Figure 11A:
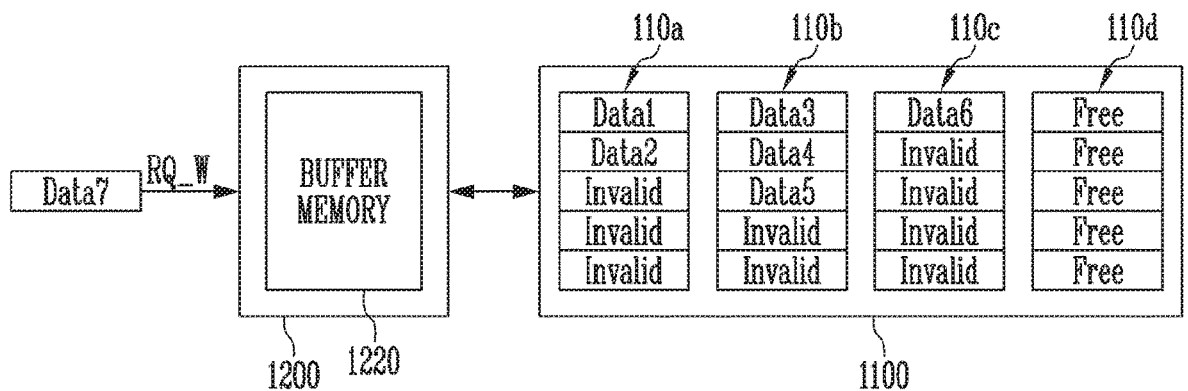
FIGS. 11A to 11F are block diagrams illustrating the operating method of the memory controller according to the embodiment of FIG. 10.

In FIG. 11A, data Data7 and a write request RQ_W corresponding thereto are transferred from the host 2000 to the memory controller 1200. The memory controller 1200 determines whether the garbage collection is required. In FIG. 11A, since one free block exists, it is determined that the garbage collection is required.

Figure 11B:
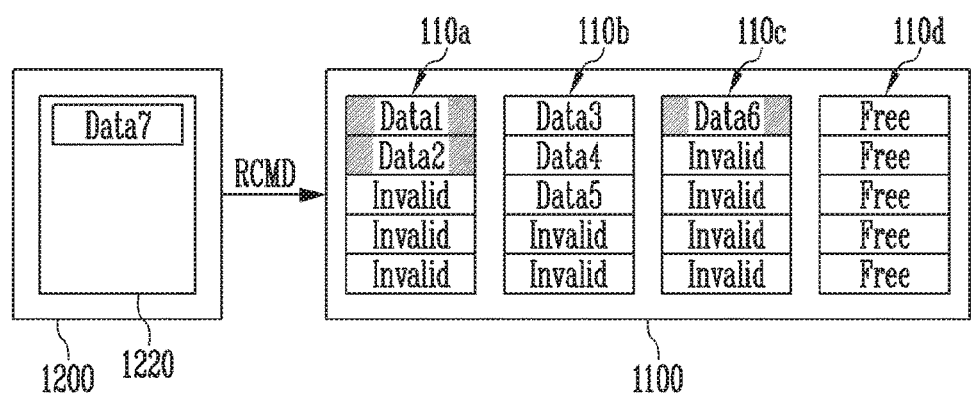

In FIG. 11B, the received data Data7 is stored as first data in the buffer memory 1220 of the memory controller 1200. The memory controller 1200 selects, as victim memory blocks, the memory blocks 110a and 110c among the memory blocks 110a, 110b, 110c, and 110d of the memory device 1100. Therefore, valid page data Data1, Data2, and Data6 written in the victim memory blocks 110a and 110c become the second data described in FIG. 10.

The memory controller 1200 transfers, to the memory device 1100, a read command for the second data that is the valid page data Data1, Data2, and Data6 stored in the memory blocks 110a and 110c selected as the victim memory blocks.

Figure 11C:
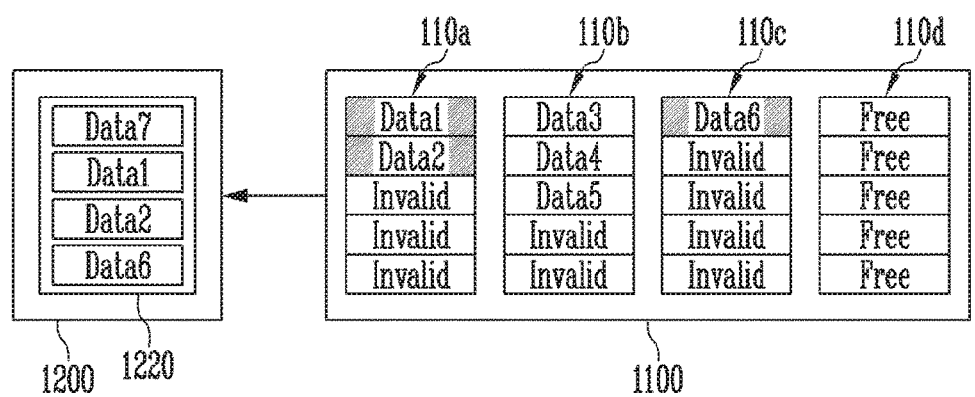

Referring to FIG. 11C, as the read command RCMD is received, the second data stored in the memory device 1100, i.e., the valid page data Data1, Data2, and Data6 of the victim memory blocks are read and transferred to the memory controller 1200. The transferred data may be stored in the buffer memory 1220. Accordingly, the data Data7 that is the first data received form the host 2000 and the data Data1, Data2, and Data6 that is the second data from the victim memory blocks are stored in the buffer memory 1220.

Figure 11D:
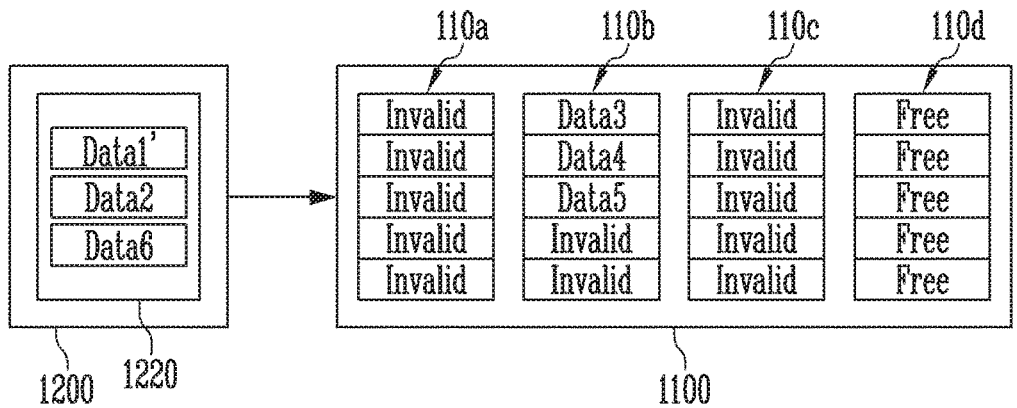

Referring to FIG. 11D, the memory controller 1200 generates third data Data1, Data2, and Data6, based on the data Data7 that is the first data and the data Data1, Data2, and Data6 that is the second data. For example, the data Data7 received from the host 2000 may be for updating the data Data1 included in the second data. The memory controller 1200 may generate data Data1' updated based on the data Data7 and Data1. The updated data Data1' is included in the above-described third data Data1, Data2, and Data6. The third data refers to write data as described with reference to FIG. 10.

Figure 11E:
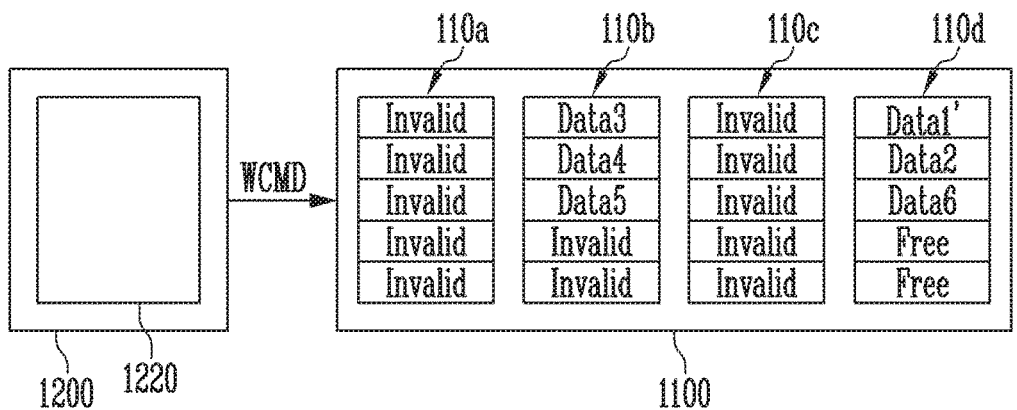

Referring to FIG. 11E, the memory controller 1200 selects, as a target memory block, the memory block 110d, which is the free block. Also, the memory controller 1200 generates a write command WCMD for writing, in the target memory block, the third data Data1, Data2, and Data6 stored in the buffer memory 1220, and transfers the generated write command WCMD to the memory device 1100. The data Data1, Data2, and Data6 along with the write command WCMD may also be transferred to the memory device 1100. Accordingly, the memory device 1100 writes the received data Data1, Data2, and Data6 in the memory block 110d that is the target memory block. As the updated valid page data Data1' and another valid page data Data2 and Data6 are written in the target memory block, the data stored in the memory blocks 110a and 110c, which are victim memory blocks, becomes invalid.

Figure 11F:
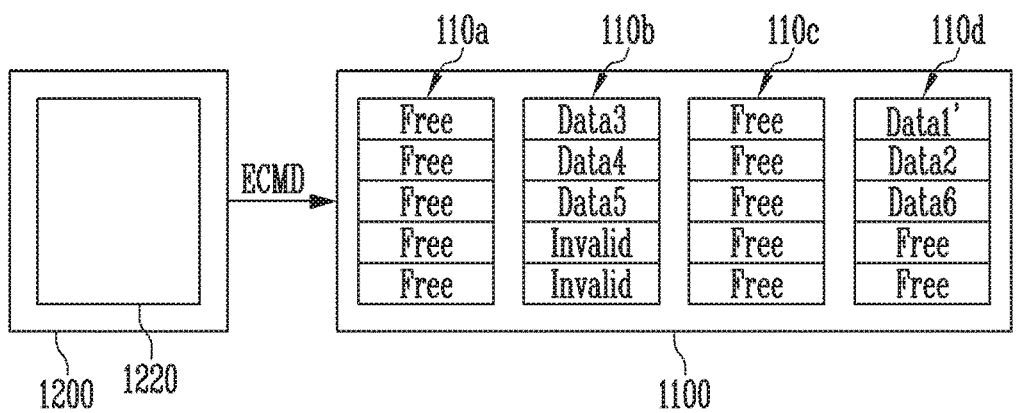

Referring to FIG. 11F, the memory controller 1200 transfers, to the memory device 1100, an erase command ECMD for erasing the memory blocks 110a and 110c, which have become the victim memory blocks. As the erase command ECMD is received, the memory device 1100 erases the memory blocks 110a and 110c. Accordingly, the memory blocks 110a and 110c are changed to free blocks.

As shown in FIGS. 11A to 11F, in the memory controller and the operating method thereof according to an embodiment of the present disclosure, a garbage collection operation of the memory device 1100 is performed together with a write operation of data received from the host 2000. Consequently, the continuous write operation of the memory system 1000 can be ensured, and write latency of the write request received from the host 2000 can be reduced.

As described in FIGS. 11A to 11F, in the operating method of the memory controller according to an embodiment of the present disclosure, the third data is generated based on the first data received from the host 2000 and the second data stored in the victim memory block. In an embodiment, the third data may be data generated by updating the second data, based on the first data. In another embodiment, the third data may be data generated by deleting overlapping data in the first data and the second data.

Figure 12:
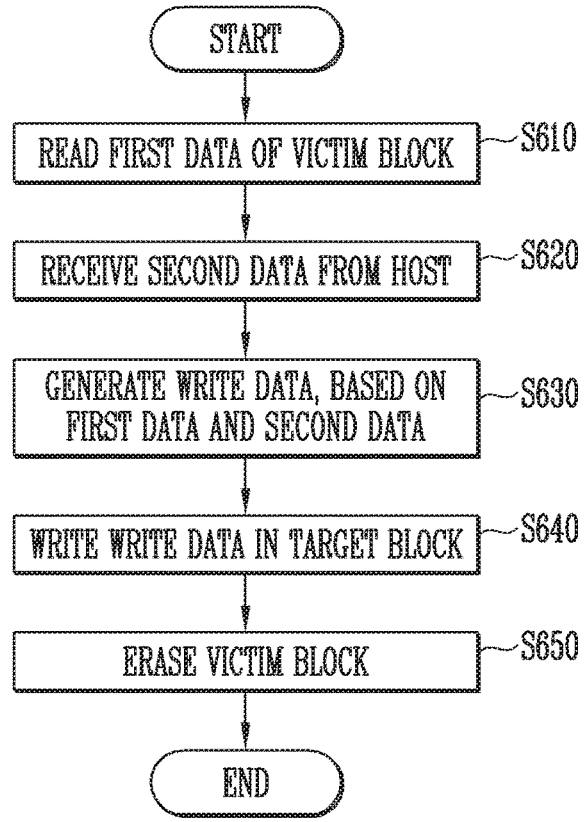
FIG. 12 is a flowchart illustrating an operating method of the memory controller according to still another embodiment of the present disclosure.

FIG. 12 is a flowchart illustrating an operating method of the memory controller according to still another embodiment of the present disclosure.

In step S610, the memory controller 1200 reads first data of a victim memory block in the memory device 1100. The first data has already been written to and stored in the victim memory block of the memory device 1100, and may be stored valid page data on which a garbage collection operation is to be performed. The read first data may be temporarily stored in the buffer memory 1220.

In step S620, the memory controller 1200 receives second data from the host 2000. The second data is data received together with a write request from the host 2000, and may be data to be written to the memory device 1100. The received second data may be temporarily stored in the buffer memory 1220.

In step S630, the memory controller 1200 generates write data based on the first data and the second data. The write data may include the first data and the second data. The case where the write data simply includes the first data and the second data has been described with reference to FIGS. 6A to 6E and 9A to 9F.

When the first data and the second data partially overlap, or when a portion of the first data is for updating a portion of the second data, the write data may be data generated by modifying or correcting the first data and the second data. For example, when the first data and the second data partially have the same content, the write data may be data that includes the first data and the second data, in which the overlapping content is deleted. An example in which the write data is data generated by modifying the first data or the second data has been described with reference to FIG. 11D.

In step S640, the memory controller 1200 writes the generated write data in a target memory block. The target memory block may be selected as a migration destination of valid page data of the victim memory block in a garbage collection operation, and a free block may be selected as the target memory block. Additionally, the memory controller 1200 may update a mapping table such that physical data of the valid page data is updated after the valid page data is written in the target memory block.

In step S650, the memory controller 1200 erases the victim memory block. Since the valid page data, i.e., the first data that has been stored in the victim memory block is written in the target memory block, no valid page exists; only invalid pages exist. Accordingly, as the victim memory block is erased, a free block can be secured.

When comparing FIGS. 10 and 12, in the embodiment of FIG. 10, the memory controller 1200 first receives the first data from the host (see S510) and then reads the second data of the victim memory block (S520). On the other hand, in the embodiment of FIG. 12, the memory controller 1200 first reads the first data of the victim memory block and then receives the second data from the host. According to the embodiment of FIG. 12, the memory controller 1200 selects a victim memory block on which garbage collection is to be performed before a write request and write data are received from the host 2000, reads, in advance, valid page data stored in the selected victim memory block and then stores the read valid page data in the buffer memory device 1220. According to the embodiment of FIG. 12, when the write request and the write data are received from the host 2000, the memory controller 1200 immediately writes, in the target memory block of the memory device 1100, valid page data that has already been stored in the buffer memory 1220 and the write data received from the host. Accordingly, the time from when the write request is received to from the host 2000 to when a write operation is completed is reduced. Consequently, the operation speed of the memory system 1000 can be improved.

Figure 13:
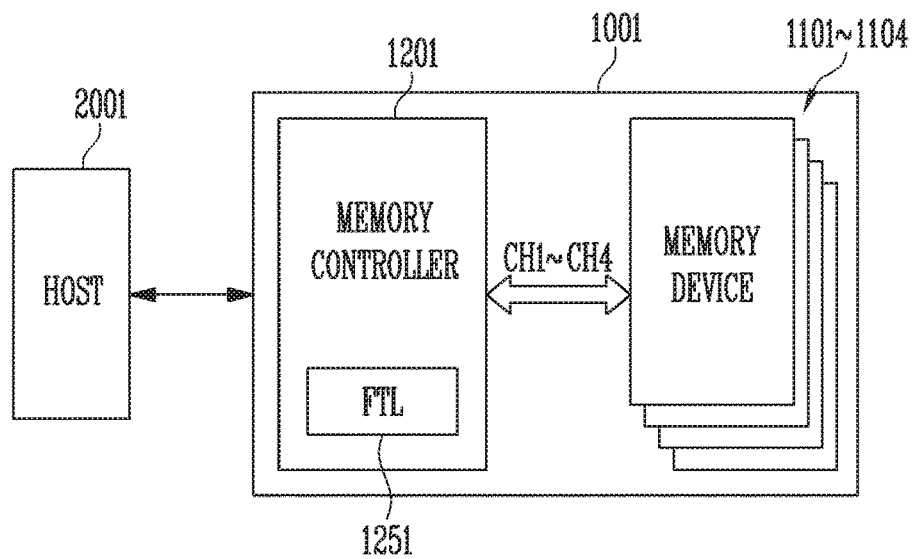
FIG. 13 is a block diagram illustrating another example of the memory system.

FIG. 13 is a block diagram illustrating another example of the memory system.

Referring to FIG. 13, the memory system 1001 includes a memory controller 1201 and first to fourth memory devices 1101 to 1104. A host 2001 and the memory controller 1201 are described with reference to FIG. 1, and therefore, overlapping description of these components is omitted here. An FTL 1251 may also be substantially identical to the FTL 1250 described with reference to FIG. 1.

Each of the first to fourth memory devices 1101 to 1104 may be the memory device 1100 described with reference to FIGS. 1 to 3. Each of the first to fourth memory devices 1101 to 1104 may be coupled to the memory controller 1201 through first to fourth channels CH1 to CH respectively, and independently operate under the control of the memory controller 1201. For example, the plurality of memory devices 1101 to 1104 may simultaneously program different data. As an example, each of the plurality of memory devices 1101 to 1104 may be configured with an individual chip, and together may be provided as a multi-chip package (MCP).

As an example, the memory system 1001 may further include more than the four memory devices 1101 to 1104 shown.

The memory controller 1201 shown in FIG. 13 may also control operations of the first to fourth memory devices 1101 to 1104 to perform a garbage collection operation together with a write operation of data received from the host 2001. Consequently, the continuous write operation of the memory system 1001 can be ensured, and write latency of the write request received from the host 2001 can be reduced.

Figure 14:
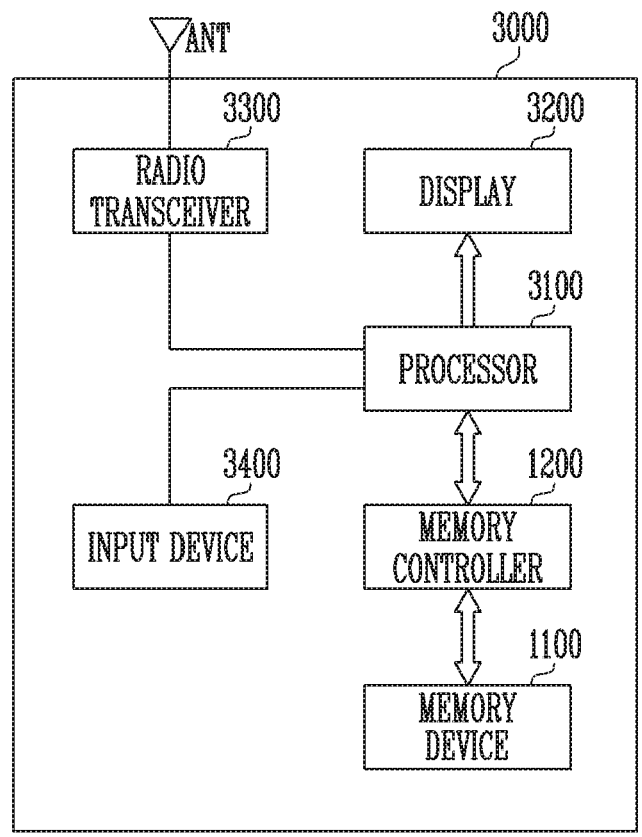
FIG. 14 is a diagram illustrating another embodiment of the memory system including the memory controller shown in FIGS. 1 and 2.

FIG. 14 is a diagram illustrating another embodiment of the memory system including the memory controller shown in FIGS. 1 and 2.

Referring to FIG. 14, the memory system 30000 may be implemented as a cellular phone, a smart phone, a tablet PC, a personal digital assistant (PDA), or a wireless communication device. The memory system 30000 may include a memory device 1100 and a memory controller 1200 capable of controlling an operation of the memory device 1100. The memory controller 1200 may control a data access operation of the memory device 1100, e.g., a program operation, an erase operation, a read operation, or the like under the control of a processor 3100.

Data programmed in the memory device 1100 may be output through a display 3200 under the control of the memory controller 1200.

A radio transceiver 3300 may transmit/receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the semiconductor memory device 1100. Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

In some embodiments, the memory controller 1200 capable of controlling an operation of the memory device 1100 may be implemented as a part of the processor 3100, or be implemented as a chip separate from the processor 3100.

Figure 15:
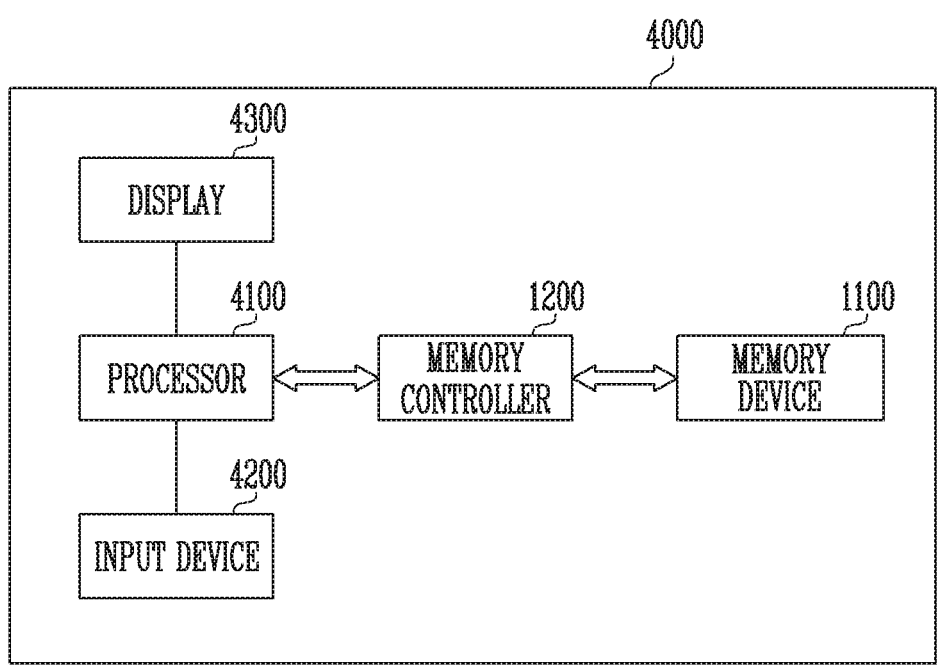
FIG. 15 is a diagram illustrating another embodiment of the memory system including the memory controller shown in FIGS. 1 and 2.

FIG. 15 is a diagram illustrating another embodiment of the memory system including the memory controller shown in FIGS. 1 and 2.

Referring to FIG. 15, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a memory device 1100 and a memory controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In some embodiments, the memory controller 1200 capable of controlling an operation of the memory device 1100 may be implemented as a part of the processor 4100, or be implemented as a chip separate from the processor 4100.

Figure 16:
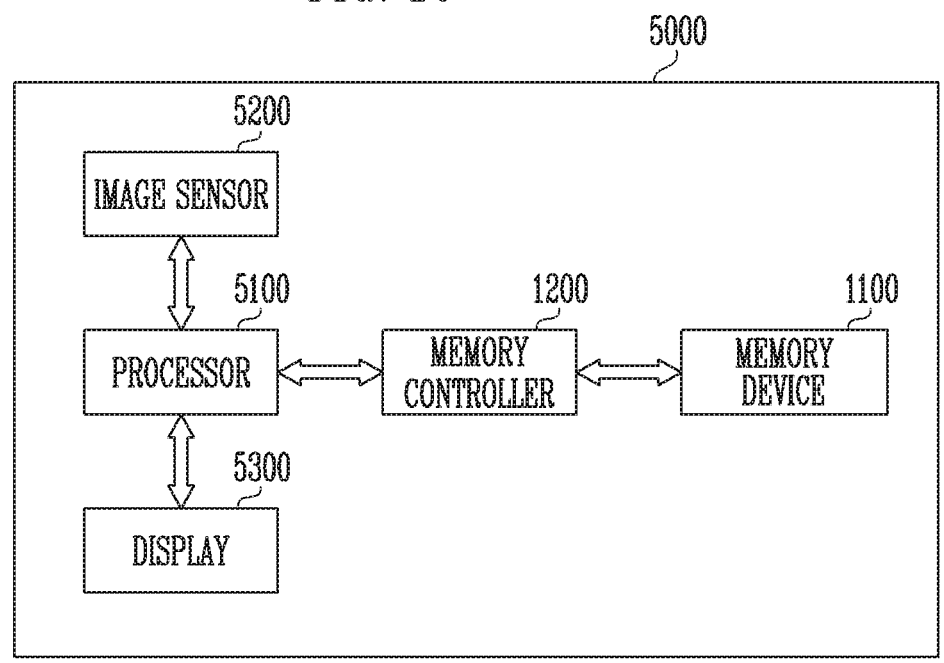
FIG. 16 is a diagram illustrating another embodiment of the memory system including the memory controller shown in FIGS. 1 and 2.

FIG. 16 is a diagram illustrating another embodiment of the memory system including the memory controller shown in FIGS. 1 and 2.

Referring to FIG. 16, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 1100 and a memory controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a processor 5100 or the memory controller 1200. Under the control of the processor 5100, the converted digital signals may be output through a display 5300, or be stored in the memory device 1100 through the memory controller 1200. In addition, data stored in the memory device 1100 may be output through the display 5300 under the control of the processor 5100 or the memory controller 1200.

In some embodiments, the memory controller 1200 capable of controlling an operation of the memory device 1100 may be implemented as a part of the processor 5100, or be implemented as a chip separate from the processor 5100.

Figure 17:
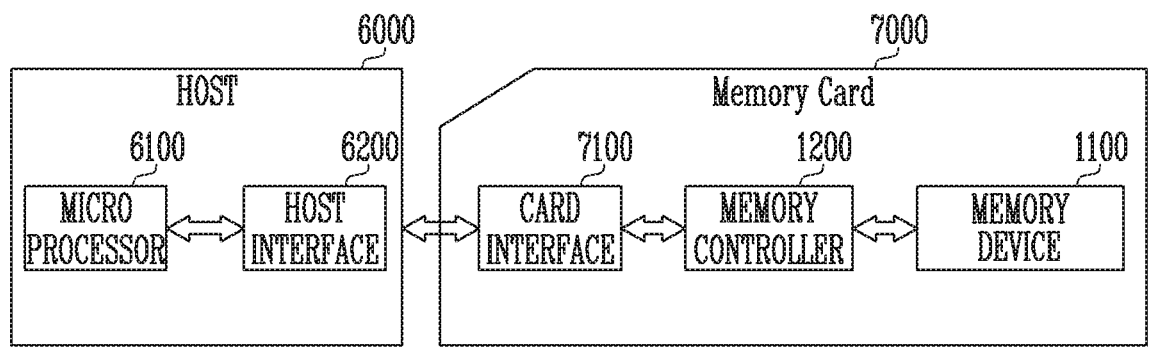
FIG. 17 is a diagram illustrating another embodiment of the memory system including the memory controller shown in FIGS. 1 and 2.

FIG. 17 is a diagram illustrating another embodiment of the memory system including the memory controller shown in FIGS. 1 and 2.

Referring to FIG. 17, the memory system 70000 may be implemented as a memory card or a smart card. The memory system 70000 may include a memory device 1100, a memory controller 1200, and a card interface 7100.

The memory controller 1200 may control data exchange between the memory device 1100 and the card interface 7100. In some embodiments, the card interface 7100 may be a secure digital (SD) card interface or a multi-media card (MMC) interface, but the present disclosure is not limited thereto.

The card interface 7100 may interface data exchange between a host 60000 and the memory controller 1200 according to a protocol of the host 60000. In some embodiments, the card interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the memory controller 1200 under the control of a microprocessor 6100.

According to embodiments of the present disclosure, a memory controller capable of reducing write latency is provided.

Further, according to embodiments of the present disclosure, an operating method of a memory controller capable of reducing write latency is provided.

Various embodiments have been disclosed herein, and although specific terms are employed, they are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller for controlling an operation of a memory device, the memory controller comprising:
a buffer memory; and
a processor configured to:
in response to a write request and first data received from a host, generate third data by comparing the first data and second data read from a victim memory block, and generate a write command for programming the third data to the memory device.

2. The memory controller of claim 1, wherein, the processor is configured to:
control the buffer memory to store the first data,
select the victim memory block of the memory device, and
generate a read command for reading valid page data stored in the victim memory block.

3. The memory controller of claim 1, wherein the processor is configured to control the buffer memory to store the second data.

4. The memory controller of claim 3, wherein the processor is configured to generate the write command for programming the third data to the memory device after the second data is stored in the buffer memory.

5. The memory controller of claim 1, wherein the third data includes data generated by updating the second data based on the first data.

6. The memory controller of claim 1, wherein the third data includes the first data and the second data and is generated by deleting overlapping data in the first data and the second data.

7. The memory controller of claim 1, wherein the processor is configured to:
determine whether garbage collection of the memory device is required by monitoring the memory device periodically, and store the second data in the buffer memory, in response to a determination that the garbage collection of the memory device is required.

8. The memory controller of claim 1, wherein the first data and the second data are compared to identify whether the first data and the second data have the same content.

9. The memory controller of claim 1, wherein the processor updates a mapping table after programming the third data to the memory device.

10. The memory controller of claim 1, wherein the processor controls the memory device to erase the victim memory block, after programming the third data to the memory device.

11. A method for operating a memory controller for controlling an operation of a memory device, the method comprising:
receiving a write request and first data from a host;

in response to the write request, controlling the memory device to read second data written in a victim memory block of the memory device;

generating third data by comparing the first data and the second data read from the victim memory block; and controlling the memory device to write the third data in a target memory block of the memory device.

12. The method of claim 11, further comprising:

controlling the memory device to erase the victim memory block.

13. The method of claim 11, wherein the controlling of the memory device to read the second data written in the victim memory block of the memory device includes:

selecting, as the victim memory block, at least one memory block in which the number of invalid pages is larger than a set reference value based on valid and invalid pages written in memory blocks of the memory device;

generating a read command for reading valid page data in the victim memory block;

transferring the read command to the memory device; and receiving the second data corresponding to the read command.

14. The method of claim 11, wherein the third data includes the first data and the second data and is generated by deleting overlapping data in the first data and the second data.

15. The method of claim 11, wherein the third data includes data generated by updating the second data based on the first data.

16. A method for operating a memory controller for controlling an operation of a memory device, the method comprising:

determining whether garbage collection is required by monitoring the memory device;

in response to a determination that the garbage collection of the memory device is required, selecting a victim memory block of the memory device;

controlling the memory device to read first data stored in the victim memory block;

receiving a write request and second data from a host;

in response to the write request, generating third data by comparing the first data and the second data; and controlling the memory device to write the third data in a target memory block of the memory device.

17. The method of claim 16, wherein, the determining of whether the garbage collection is required comprises:

determining whether the number of free memory blocks in the memory device is less than or equal to a reference value, determining that the garbage collection of the memory device is required when the number of free memory blocks is less than or equal to the reference value, and determining that the garbage collection of the memory device is not required when the number of free memory blocks is greater than the reference value.

18. The method of claim 16, wherein, in the selecting of the victim memory block of the memory device, at least one memory block in which the number of invalid pages is greater than a set reference value is selected as the victim memory block.

19. A memory system comprising:

a memory device; and a controller configured to control the memory device to perform a garbage collection operation of moving valid data of a victim memory block into a target memory block in the memory device, in response to a request of a write operation, while performing the write operation of storing write data into the target memory block, wherein the controller gathers, during the garbage collection operation and the write operation, the valid data and the write data in a buffer in the controller and provides the gathered data to the memory device, and wherein the gathered data is generated by comparing the valid data and the write data.

* * * * *